(12) United States Patent
Couet et al.

(10) Patent No.: US 7,716,029 B2
(45) Date of Patent: May 11, 2010

(54) METHOD FOR OPTIMAL GRIDDING IN RESERVOIR SIMULATION

(75) Inventors: Benoit Couet, Weston, CT (US);
Michael Prange, Danbury, CT (US);
William Bailey, Danbury, CT (US);
Hugues Djikpesse, Stamford, CT (US);
Vladimir Druskin, Brookline, MA (US)

(73) Assignee: Schlumberger Technology Corporation, Houston, TX (US)

( * ) Notice: Subject to any disclaimer, the term of this patent is extended or adjusted under 35 U.S.C. 154(b) by 397 days.

(21) Appl. No.: 11/656,840

(22) Filed: Jan. 23, 2007

(65) Prior Publication Data

US 2007/0265815 A1    Nov. 15, 2007

Related U.S. Application Data

(60) Provisional application No. 60/800,502, filed on May 15, 2006.

(51) Int. Cl.
*G06G 7/48*    (2006.01)
(52) U.S. Cl. .......................................... 703/10
(58) Field of Classification Search .................... 703/10
See application file for complete search history.

(56) References Cited

U.S. PATENT DOCUMENTS 6,005,916 A * 12/1999 Johnson et al. ............... 378/87
6,018,497 A    1/2000 Gunasekera
6,078,869 A    6/2000 Gunasekera
6,106,561 A    8/2000 Farmer
6,826,483 B1 * 11/2004 Anderson et al. ............. 702/13
2005/0234690 A1    10/2005 Mainguy

OTHER PUBLICATIONS

Benjamin A. Hardy (New Method for the Rapid Calculation of Finely-Gridded Reservoir Simulation Pressures, pp. 1-178; Dec. 2005).*
Stern et al; "A technique for generating reservoir simulation grids to preserve geologic heterogeneity"; Proceedings of the SPE Reservoir Simulation Symposium, XX, XX, No. 51942, Feb. 14, 1999, pp. 1-29, XP002298644.
Durlofsky et al; "Scale up of hterogeneous three dimensional reservoir descriptions"; SPE Annual Technical Conference and Exhibition, XX, XX, No. 30709, Oct. 22, 1995, pp. 313-326; XP002186719.

* cited by examiner

*Primary Examiner*—Paul L Rodriguez
*Assistant Examiner*—Andre Pierre Louis

(57)    ABSTRACT

A method is disclosed for performing optimal gridding in reservoir simulation, the method comprising: establishing an optimal coarse grid proxy that can replace all or parts of a fine grid with a coarse grid while preserving an accuracy of a predefined simulation model output, the step of establishing an optimal coarse grid proxy including finding, by using an optimizer, a best fit of a coarse grid output to the output of a training set.

42 Claims, 20 Drawing Sheets

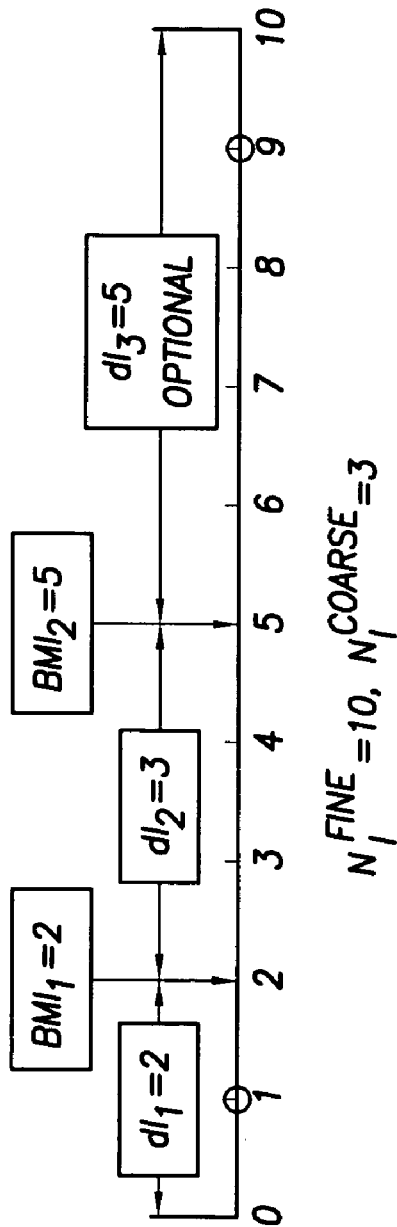
FIG.1.1
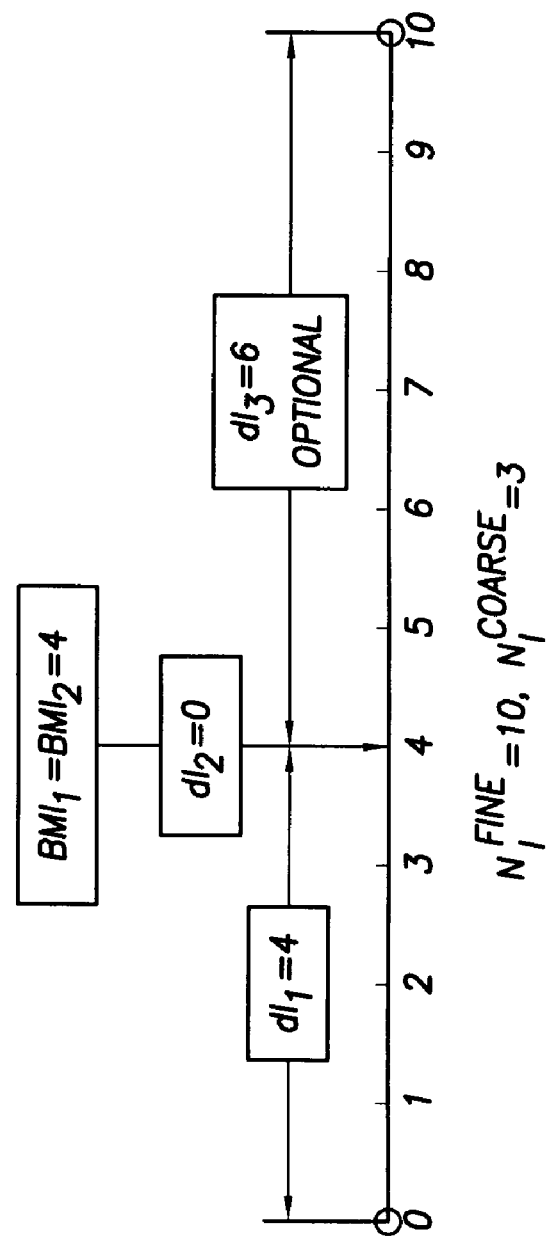
FIG.1.2

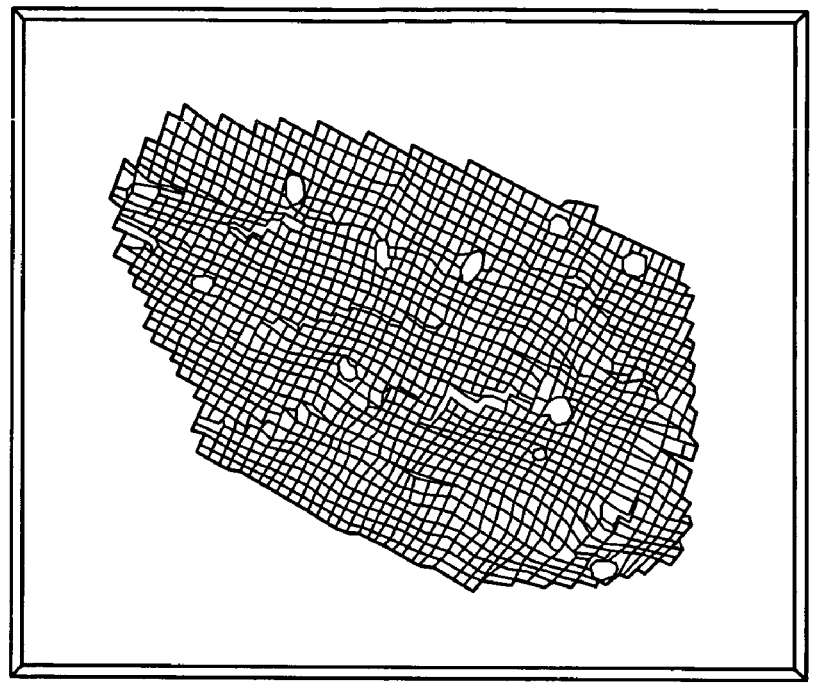
FIG.1.4
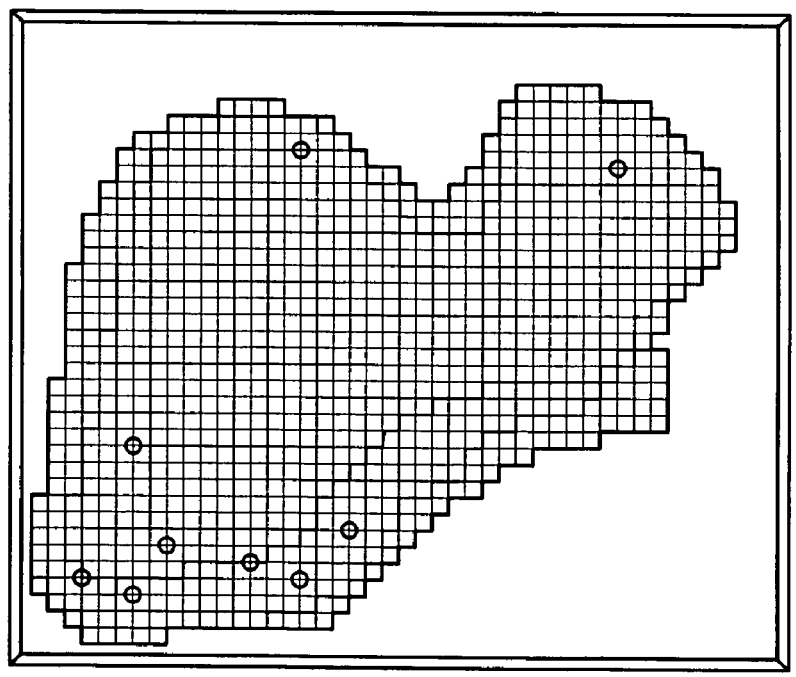
FIG.1.3

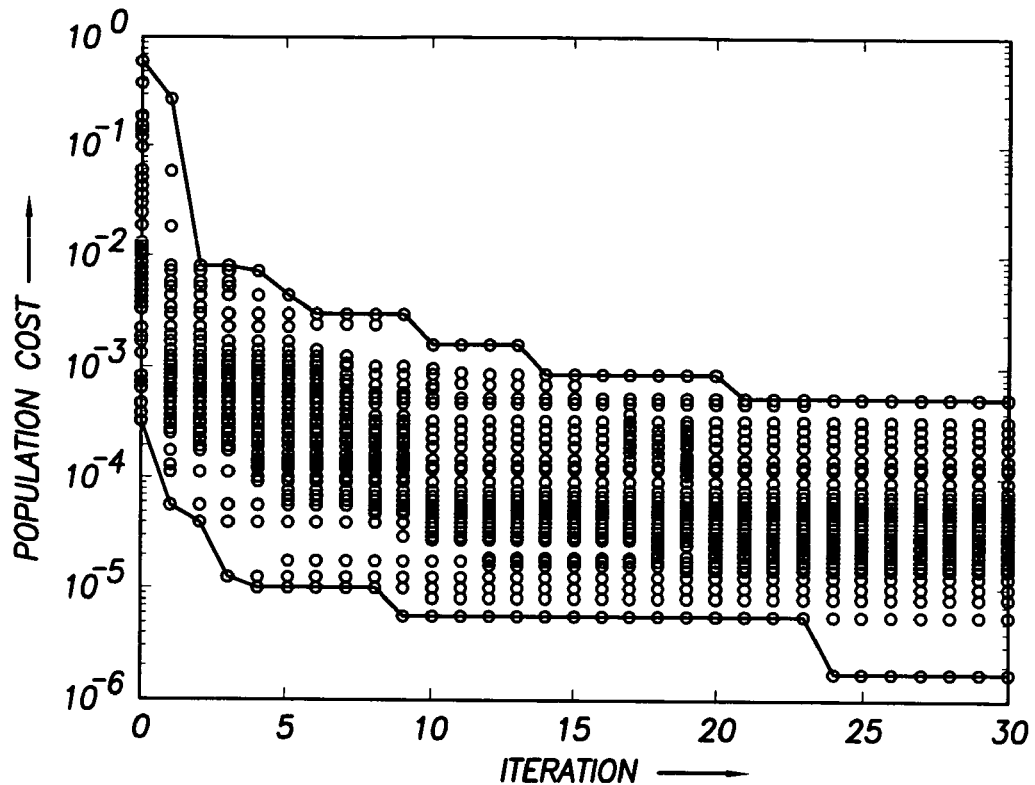
FIG.2.1
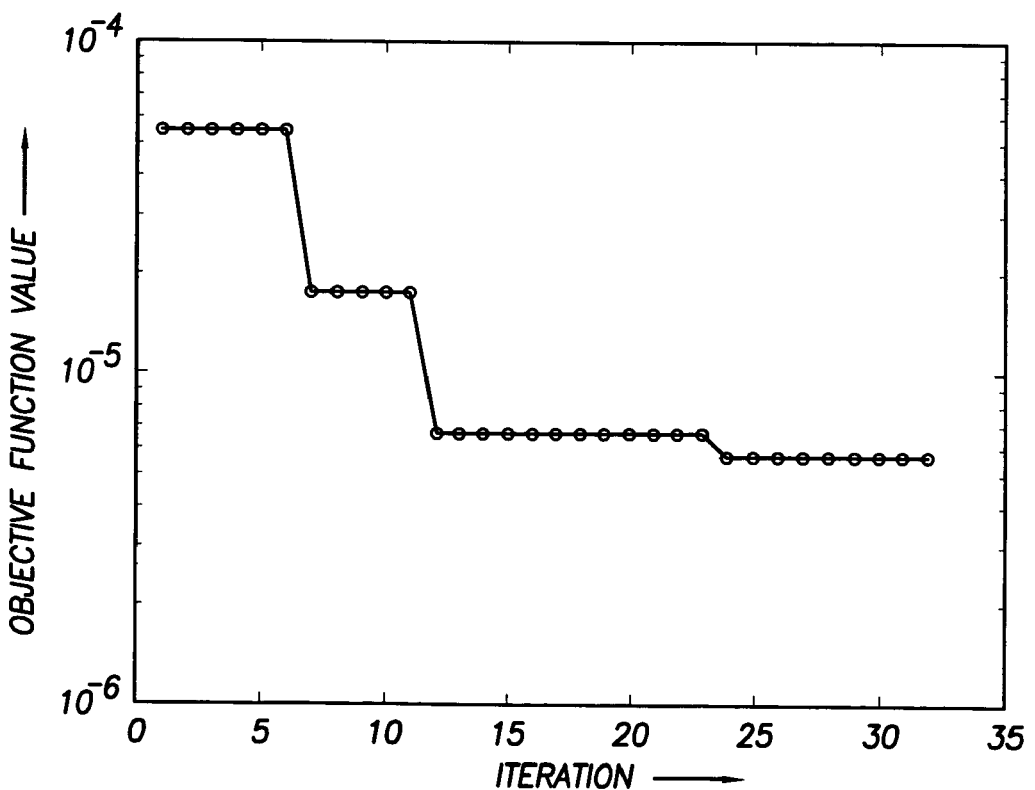
FIG.2.2

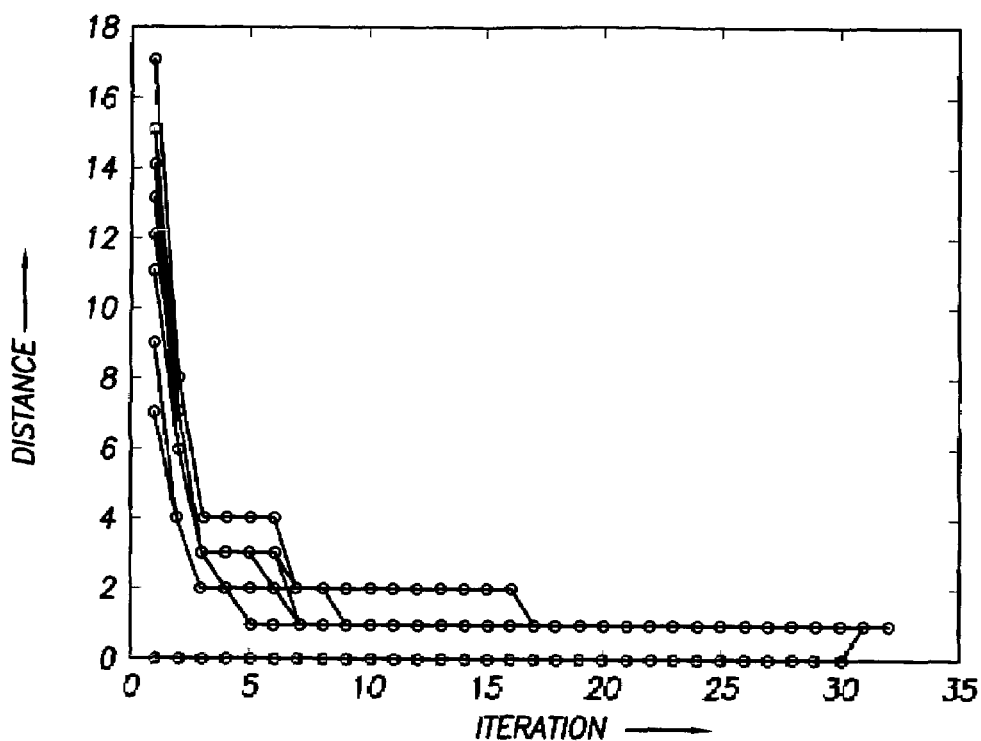
FIG.2.3
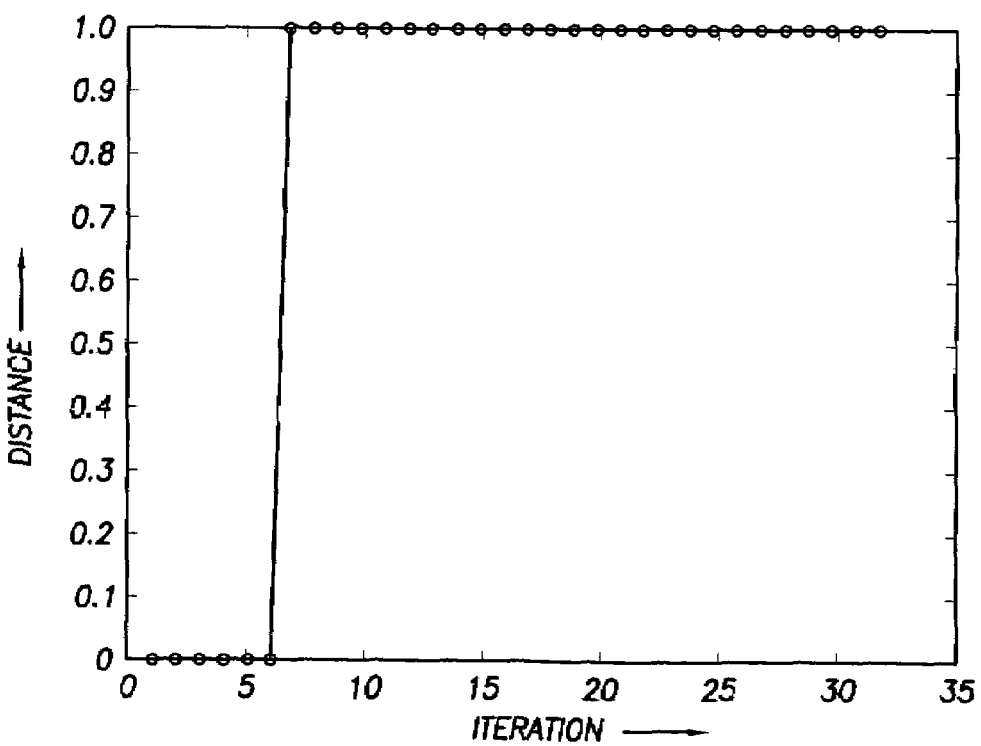
FIG.2.4

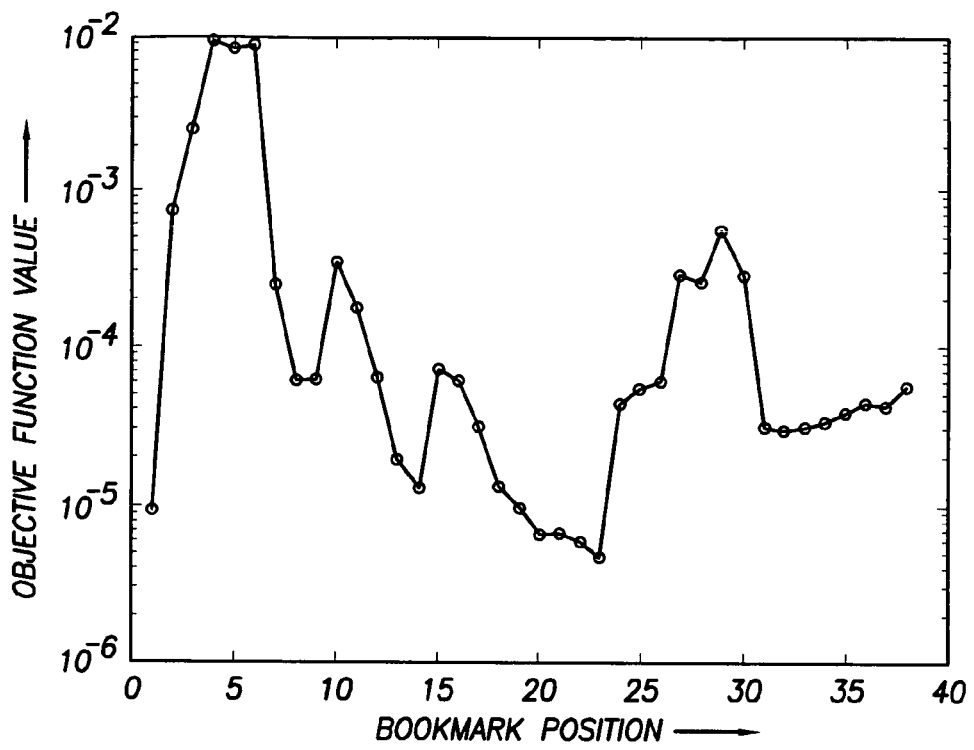
FIG.2.5
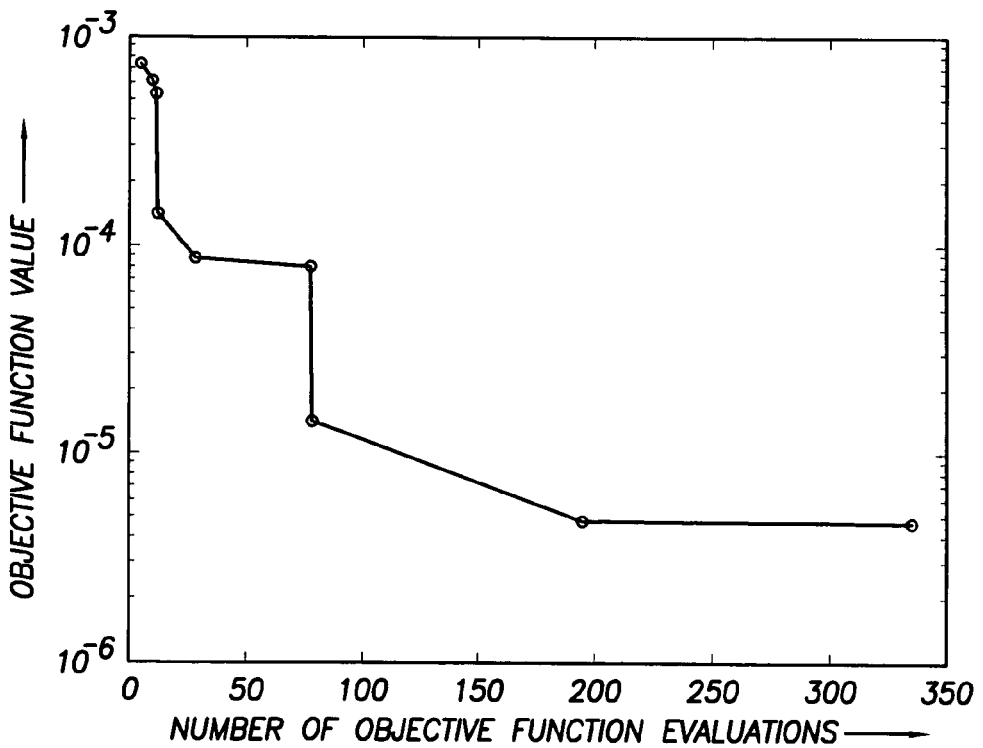
FIG.2.6

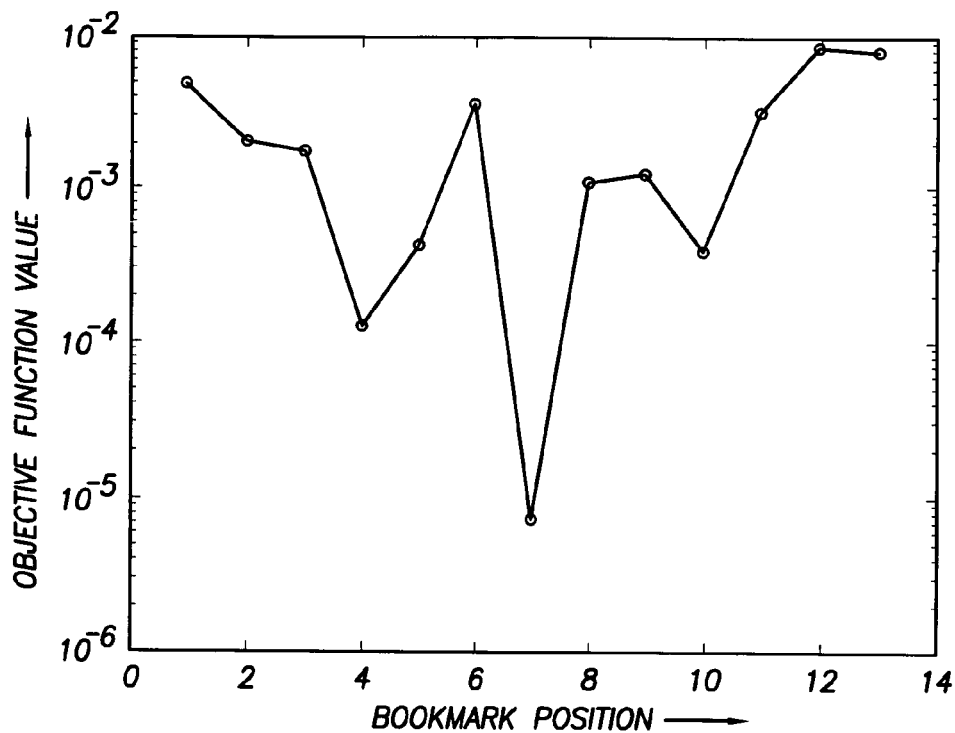
FIG.2.7
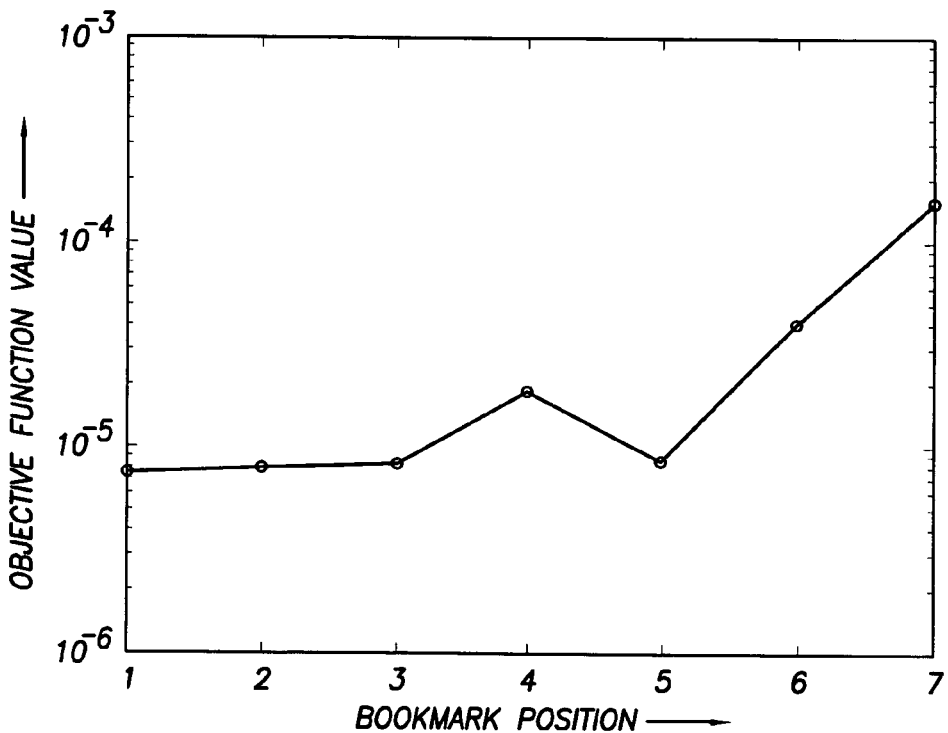
FIG.2.8

FIG.2.9

METHOD FOR OPTIMAL GRIDDING IN RESERVOIR SIMULATION

CROSS REFERENCE TO RELATED APPLICATIONS

This is a Application of Provisional Application Ser. No. 60/800,502, filed May 15, 2006, entitled "Method for Optimal Gridding in Reservoir Simulation".

BACKGROUND

This subject matter disclosed in this specification relates to a method, and its associated system and program storage device and computer program, which is adapted to be practiced by a 'Coarsening Software' stored in a memory of a computer system, the method relating to optimal gridding in reservoir simulation and replacing all or parts of a fine grid with a coarser grid in reservoir simulation while preserving a simulation model output, such as the 'cumulative oil production'.

Simulation performance is a crucial consideration in optimization problems involving reservoir simulation tools. Such simulation models often involve grids sufficiently resolved to capture the complexities in the geological structures present. This level of detail is needed so that subsequent pressure and saturation profiles may be deemed a reasonable basis from which large capital decisions may be made. The 'cost' of using such detailed grids includes long simulation run times. This 'cost' or 'downside' is magnified when the reservoir simulator is repeatedly called, as is the case in reservoir forecast optimization.

In this specification, a 'Coarsening Software', also known as a 'coarsening algorithm' or an 'Optimization Algorithm' or an 'Optimizer', is disclosed. This 'Coarsening Software' or 'Optimizer' was developed to establish an optimal coarse grid proxy that can replace all, or parts, of a fine grid, in reservoir simulation, with a coarser grid while preserving the accuracy of some predefined 'simulation model outputs', where one such 'simulation model output' includes a 'cumulative field oil production' also known as the 'Field Oil Production Total' or 'FOPT'.

SUMMARY

One aspect of the present invention involves a method for optimal gridding in reservoir simulation, comprising: establishing an optimal coarse grid proxy that can replace all or parts of a fine grid with a coarse grid while preserving an accuracy of a predefined simulation model output, the step of establishing an optimal coarse grid proxy including, finding, by using an optimizer, a best fit of a coarse grid output to the output of a training set.

Another aspect of the present invention involves program storage device readable by a machine tangibly embodying a set of instructions executable by the machine to perform method steps for optimal gridding in reservoir simulation, the method steps comprising: establishing an optimal coarse grid proxy that can replace all or parts of a fine grid with a coarse grid while preserving an accuracy of a predefined simulation model output, the step of establishing an optimal coarse grid proxy including, finding, by using an optimizer, a best fit of a coarse grid output to the output of a training set.

Another aspect of the present invention involves a computer program adapted to be executed by a processor, the computer program, when executed by the processor, conducting a process for optimal gridding in reservoir simulation, the process comprising: establishing an optimal coarse grid proxy that can replace all or parts of a fine grid with a coarse grid while preserving an accuracy of a predefined simulation model output, the step of establishing an optimal coarse grid proxy including, finding, by using an optimizer, a best fit of a coarse grid output to the output of a training set.

Another aspect of the present invention involves a system adapted for performing optimal gridding in reservoir simulation, the system comprising: apparatus adapted for establishing an optimal coarse grid proxy that can replace all or parts of a fine grid with a coarse grid while preserving an accuracy of a predefined simulation model output, the apparatus adapted for establishing an optimal coarse grid proxy including, apparatus adapted for finding, by using an optimizer, a best fit of a coarse grid output to the output of a training set.

Another aspect of the present invention involves a method for optimal gridding in reservoir simulation, comprising: establishing an optimal coarse grid proxy that can replace all or parts of a fine grid with a coarse grid while preserving an accuracy of a predefined simulation model output, the coarse grid including a plurality of coarse grid cells, the fine grid including a plurality of fine grid cells, each coarse grid cell encompassing one or more of the fine grid cells, the step of establishing an optimal coarse grid proxy including, averaging a set of material properties of the one or more of the fine grid cells into the each coarse grid cell.

Another aspect of the present invention involves a computer program adapted to be executed by a processor, the computer program, when executed by the processor, conducting a process for optimal gridding in reservoir simulation, the process comprising: establishing an optimal coarse grid proxy that can replace all or parts of a fine grid with a coarse grid while preserving an accuracy of a predefined simulation model output, the coarse grid including a plurality of coarse grid cells, the fine grid including a plurality of fine grid cells, each coarse grid cell encompassing one or more of the fine grid cells, the step of establishing an optimal coarse grid proxy including, averaging a set of material properties of the one or more of the fine grid cells into the each coarse grid cell.

Another aspect of the present invention involves a program storage device readable by a machine tangibly embodying a set of instructions executable by the machine to perform method steps for optimal gridding in reservoir simulation, the method steps comprising: establishing an optimal coarse grid proxy that can replace all or parts of a fine grid with a coarse grid while preserving an accuracy of a predefined simulation model output, the coarse grid including a plurality of coarse grid cells, the fine grid including a plurality of fine grid cells, each coarse grid cell encompassing one or more of the fine grid cells, the step of establishing an optimal coarse grid proxy including, averaging a set of material properties of the one or more of the fine grid cells into the each coarse grid cell.

Another aspect of the present invention involves a system adapted for performing optimal gridding in reservoir simulation, the system comprising: apparatus adapted for establishing an optimal coarse grid proxy that can replace all or parts of a fine grid with a coarse grid while preserving an accuracy of a predefined simulation model output, the coarse grid including a plurality of coarse grid cells, the fine grid including a plurality of fine grid cells, each coarse grid cell encompassing one or more of the fine grid cells, the apparatus adapted for establishing an optimal coarse grid proxy including, averaging apparatus adapted for averaging a set of material properties of the one or more of the fine grid cells into the each coarse grid cell.

Further scope of applicability will become apparent from the detailed description presented hereinafter. It should be understood, however, that the detailed description and the specific examples set forth below are given by way of illustration only, since various changes and modifications within the spirit and scope of the 'Coarsening Software', as described and claimed in this specification, will become obvious to one skilled in the art from a reading of the following detailed description.

BRIEF DESCRIPTION OF THE DRAWINGS

A full understanding will be obtained from the detailed description presented herein below, and the accompanying drawings, which are given by way of illustration only and are not intended to be limitative to any extent, and wherein:

FIGS. 1.1, 1.2, 1.3, and 1.4 are presented in connection with other optimization algorithms discussed in this specification, and, in particular, FIG. 1.1 illustrates the relation between the bookmarks and coarse cell widths for one direction I, FIG. 1.2 illustrates and demonstrates the degenerate case when we allow cell widths $dl_i$ to be equal to zero, FIG. 1.3 illustrates a grid in connection with a first onshore field discussed in this specification, and FIG. 1.4 illustrates a grid in connection with a second offshore field discussed in this specification;

FIGS. 2.1, 2.2, 2.3, 2.4, 2.5, 2.6, 2.7, 2.8, and 2.9 are presented in connection with other optimization algorithms discussed in this specification, and, in particular, FIG. 2.1 illustrates the convergence history for one of the test runs in connection with differential evolution tested on the first onshore field, FIG. 2.2 represents a plot of the objective function value for the best simplex point in connection with the downhill-simplex method tested on the first onshore field, FIG. 2.3 represents a plot showing the distance in $\infty$-norm from the best point of the initial simplex to all the points in the simplex at each iteration;

FIG. 2.5 represents a plot showing the topology of the objective function which the method encounters while performing the search along one coordinate direction, FIG. 2.6 illustrates the convergence history of the sweeper method, FIG. 2.7 shows what has been called 'high deviation' behavior, FIG. 2.8 illustrates the 'low deviation' behavior, and FIG. 2.9 illustrates the convergence history of the globalized Slicer method;

FIGS. 4 through 18 are used during a discussion of the 'Downhill-Simplex (Nelder and Mead)' and the 'Differential Evolution' Optimization Algorithms, which are the two Optimization Algorithms that are used in the bulk of the discussion in this specification involving the 'Coarsening Software' 12 of FIGS. 1, 2, and 3, wherein:

FIG. 4 illustrates different optimization algorithm accuracies,

FIG. 5 illustrates FOPT scattering for a homogeneous synthetic model with compartment fault, FIG. 6 illustrates FOPT scattering for the heterogeneous model with compartment fault, FIG. 7 illustrates FOPT scattering for the homogeneous synthetic model with compartment fault and impermeable layer, FIG. 8 illustrates FOPT scattering for a heterogeneous synthetic model with compartment fault and impermeable layer, FIG. 9 illustrates, at left, oil saturation, and, at right, wells and connections (green dots) for the test case (an onshore field in Canada)—herein known as field case #1, FIG. 10 illustrates that rows and columns of cells containing wells are locked down in red, and only the transparent rectangles in between are left for coarsening, FIG. 11 illustrates FOPT scattering when optimizing within rectangles, FIG. 12 illustrates FOPT scattering when optimizing over the whole field, FIG. 13 illustrates a 7×7×3 grid for field case #1, FIG. 14 illustrates a 10×10×3 grid for field case #1, FIG. 15 illustrates a 15×15×3 grid for field case #1, FIG. 16 illustrates FOPT scattering for the optimization with horizontal wells, FIG. 17 illustrates a grid and well pattern, and FIG. 18 illustrates a second field example—a larger field from the North Sea) herein referred to as field case #2—Faults clearly visible.

DETAILED DESCRIPTION

Figure 1:
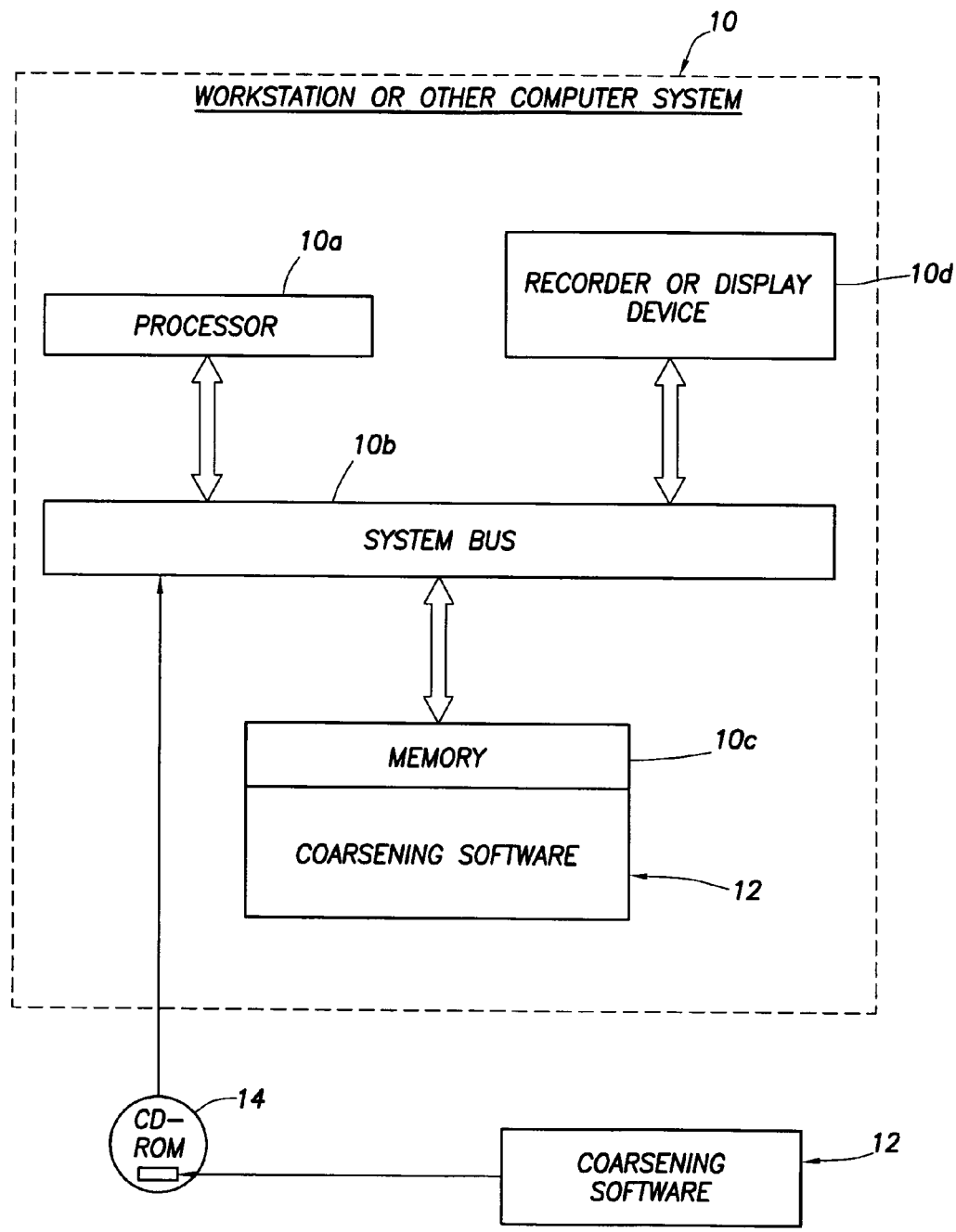
FIG. 1 illustrates a workstation or other computer system that stores the Coarsening Software, the Coarsening software being loaded from CD-Rom into memory of the workstation.

This specification discloses a 'Coarsening Software', also known as the 'Coarsening algorithm' or an 'Optimization Algorithm' or an 'Optimizer', which will replace all, or parts, of a fine grid with a coarser grid in reservoir simulation models while preserving the accuracy of some predefined 'simulation model outputs'. The subject of 'gridding' in reservoir simulation models, including structured grids and unstructured grids, can be found in the following U.S. patents: (1) U.S. Pat. No. 6,018,497 to Gunasekera, (2) U.S. Pat. No. 6,078,869 to Gunasekera, and (3) U.S. Pat. No. 6,106,561 to Farmer, the disclosures of which are each incorporated by reference into the specification of this application.

In this specification, the optimization of a reservoir simulation model is considered in which production and injection rates are varied in order to achieve maximum cumulative oil production. If it can be assumed that not all parts of the reservoir contribute equally to the cumulative oil production, some parts of the original grid used in the model can be considered over-refined. A 'Coarsening algorithm' was developed to establish an optimal coarse grid proxy that can replace all, or parts, of a fine grid with a coarser grid while preserving the accuracy of some predefined 'simulation model outputs', where one such 'simulation model output' includes a 'cumulative field oil production' or 'cumulative oil production', also known as the 'Field Oil Production Total' or 'FOPT'. This typically leads to a reduction in computation time.

The optimal coarse grid is established by first computing a 'training set' on the original fine grid. This involves 'cumulative oil production' computed from several different sets of production and injection rates. An optimizer is used in order to find the best fit to this 'training set' while adjusting the cell dimensions for a particular grid coarsening. Since the objective function in this problem may have several local minima (and gradients generally are not available), several gradient-free "global" optimizers were considered. That is, the differential evolution algorithm discussed in this specification is not the only such algorithm considered; other such optimization algorithms have been considered, as discussed at the end of this specification.

The initial fine-grid problem was a rectangular 51×51×10 reservoir model (51 cells in the i-direction, 51 cells in the j-direction and 10 cells in the K-direction, hereafter abbreviated as [51][51][10]). This grid has one vertical producer well at its center and four vertical injectors located in the corners (quincunx configuration). Uniform sampling was used in the i, j, and K directions. Three different cases were evaluated for this model: one with homogeneous permeability and porosity, one with homogeneous layers of permeability and porosity, and one with heterogeneous permeability and porosity. Four different rectangular grid coarsening were considered: [5][5][4], [7][7][5], [9][9][6] and [11][11][7] cells.

The coarsened grids were initially optimized by the 'Nelder-Mead' algorithm, which optimizes over real-valued control variables. Since the coarse grids were constrained to be rectangular, optimization of the cell widths required only a small number of optimization variables, equal to the sum of the grid dimensions minus the number of linear constraints. In order to achieve accurate results in the coarsened grids, this specification will demonstrate that it is necessary to average not only bulk material properties (permeability and porosity), but also transmissibility and well connection factors. This led to the use of a 'reservoir simulator' COARSEN keyword that does all needed averaging for the fine-to coarse-grid transformation. For example, one such 'reservoir simulator' is the 'Eclipse' reservoir simulator that is owned and operated by Schlumberger Technology Corporation of Houston, Tex. This decision required us to switch from real-to-integer-valued control variables because the COARSEN keyword averages only over whole grid cells. Note that many optimizers have been tried and others may exist that could produce better results in a given number of trials.

Following extensive tests on synthetic models, both with and without flow barriers, the 'Coarsening algorithm' was then applied to a real field case, field case #1, a small mature onshore field in Canada, first with only vertical wells and then with horizontal wells. In this case, a corner-point grid was used to represent the irregular grid, but the coarsened cells were still parameterized as a tensor-product grid in order to reduce the number of optimization control variables. As a result, the COARSEN keyword was able to successfully average the model even when multiple wells were optimized into a single cell. The 'coarse model' ran between 4 to 27 times faster than the original fine-grid model, while the error in FOPT did not exceed 1.73%.

Referring to FIG. 1, a workstation or other computer system is illustrated which stores the 'Coarsening Software' that is disclosed in this specification.

In FIG. 1, a workstation, personal computer, or other computer system 10 is illustrated adapted for storing a 'Coarsening Software'. The computer system 10 of FIG. 1 includes a Processor 10a operatively connected to a system bus 10b, a memory or other program storage device 10c operatively connected to the system bus 10b, and a recorder or display device 10d operatively connected to the system bus 10b. The memory or other program storage device 10c stores the 'Coarsening Software' 12 (also known as an 'Optimization Algorithm' 12 or an 'Optimizer' 12) that practices the 'coarsening' method or technique previously discussed and disclosed in this specification. Recall that the 'Coarsening Software' 12, will replace all, or parts, of a fine grid with a coarser grid in reservoir simulation models while preserving the accuracy of some predefined 'simulation model outputs'. The 'Coarsening Software' 12, which is stored in the memory 10c of FIG. 1, can be initially stored on a CD-ROM 14, where that CD-ROM 14 is also a 'program storage device'. That CD-ROM 14 can be inserted into the computer system 10, and the 'Coarsening Software' 12 can be loaded from that CD-ROM 14 and into the memory/program storage device 10c of the computer system 10 of FIG. 1. The Processor 10a will execute the 'Coarsening Software' 12 that is stored in memory 10c of FIG. 1; and, responsive thereto, the Processor 10a would then: (1) replace all, or parts, of a fine grid with a coarser grid in reservoir simulation models while preserving the accuracy of some predefined 'simulation model outputs', and (2) generate an output that can be recorded or displayed on the Recorder or Display device 10d of FIG. 1. The computer system 10 of FIG. 1 may be a personal computer (PC), a workstation, a microprocessor, or a mainframe. Examples of possible workstations include a Silicon Graphics Indigo 2 workstation or a Sun SPARC workstation or a Sun ULTRA workstation or a Sun BLADE workstation. The memory or program storage device 10c (including the above referenced CD-ROM 14) is a 'computer readable medium' or a 'program storage device' that is readable by a machine, such as the Processor 10a. The Processor 10a may be, for example, a microprocessor, microcontroller, or a mainframe or workstation processor. The memory or program storage device 10c, which stores the 'Coarsening Software' 12, may be, for example, a hard disk, ROM, CD-ROM, DRAM, or other RAM, flash memory, magnetic storage, optical storage, registers, or other volatile and/or non-volatile memory.

Figure 2:
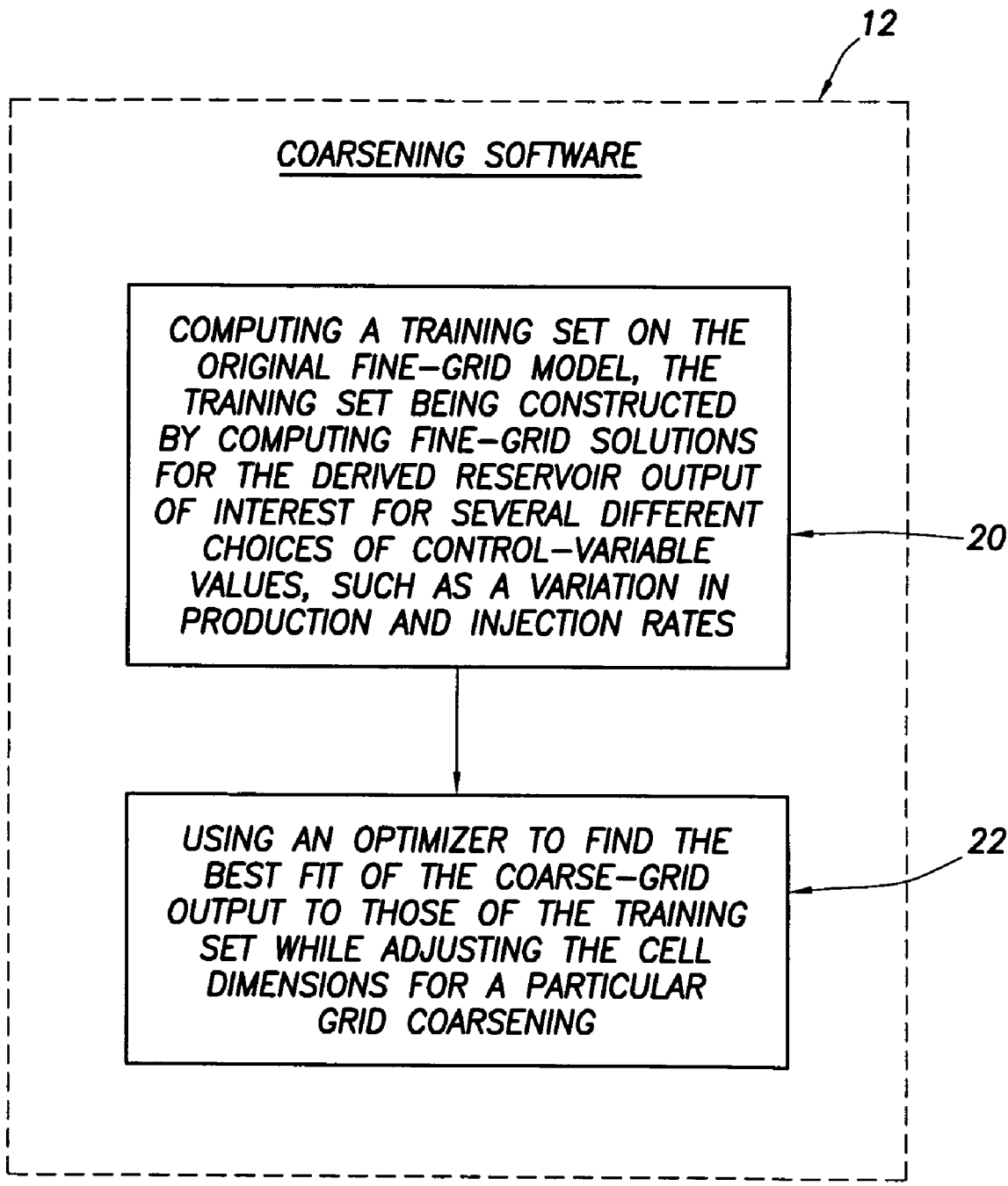
FIG. 2 illustrates a first construction of the Coarsening Software of FIG. 1.
Figure 3:
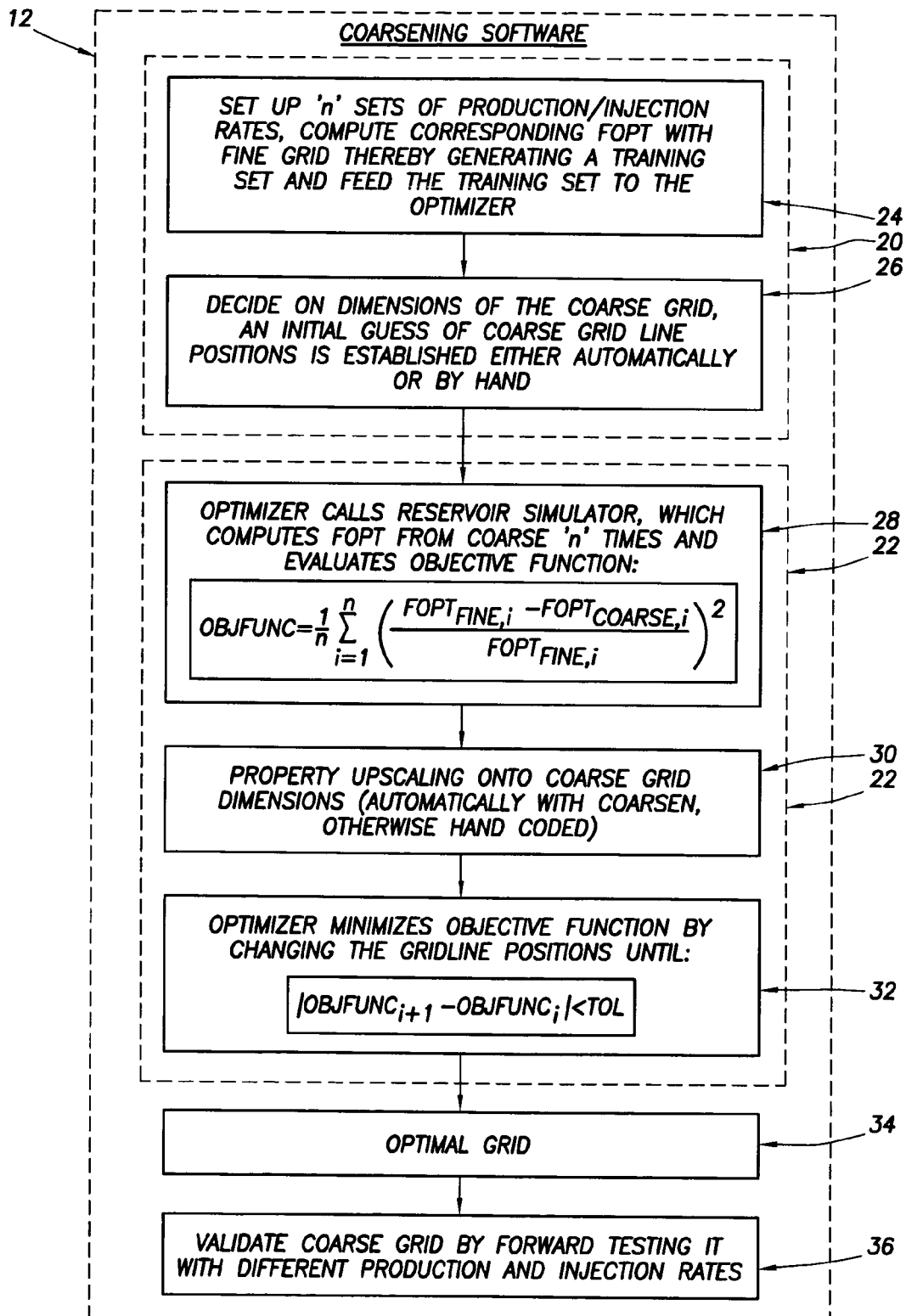
FIG. 3 illustrates a second more detailed construction of the Coarsening Software of FIG. 1.
Figure 5:
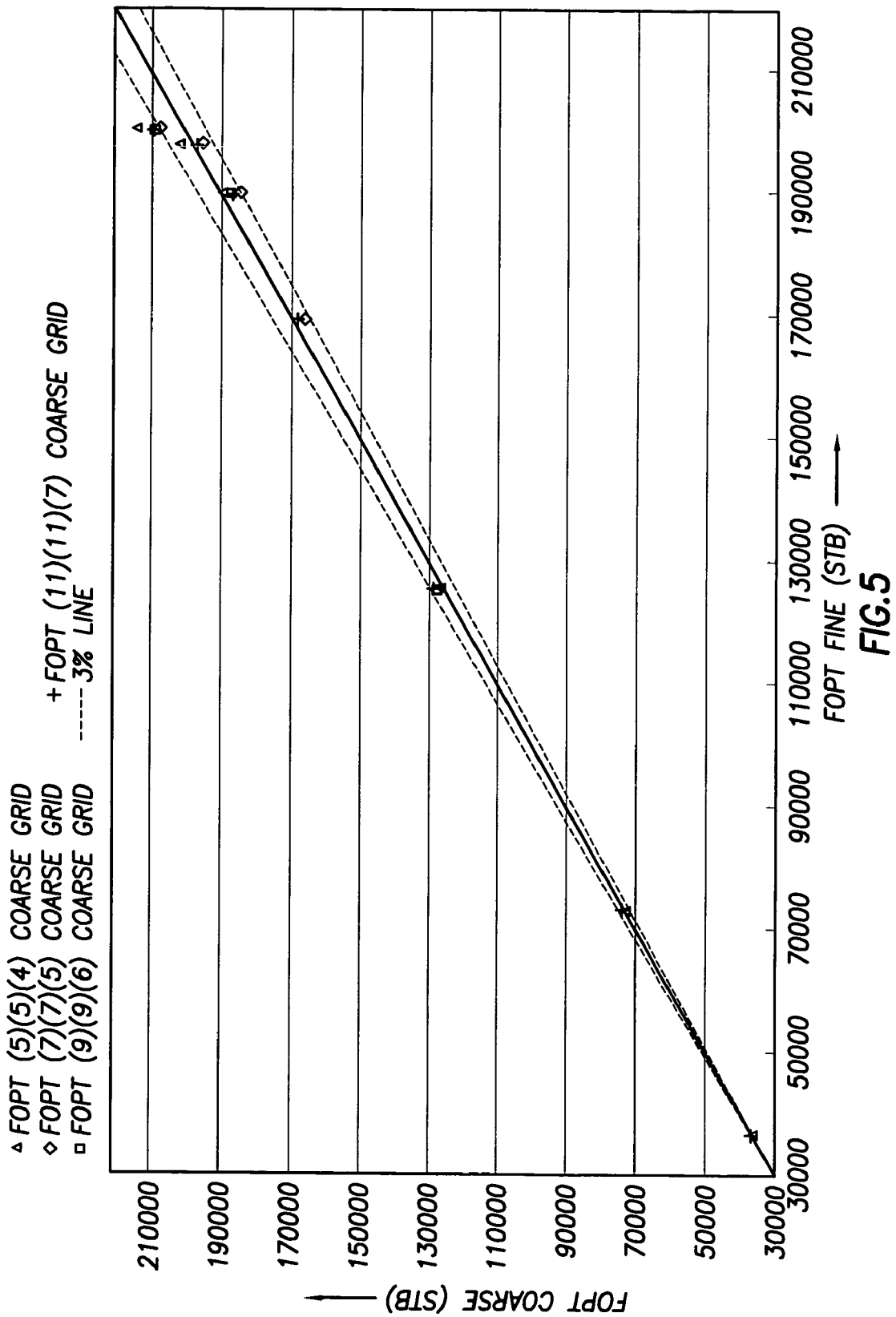
Figure 6:
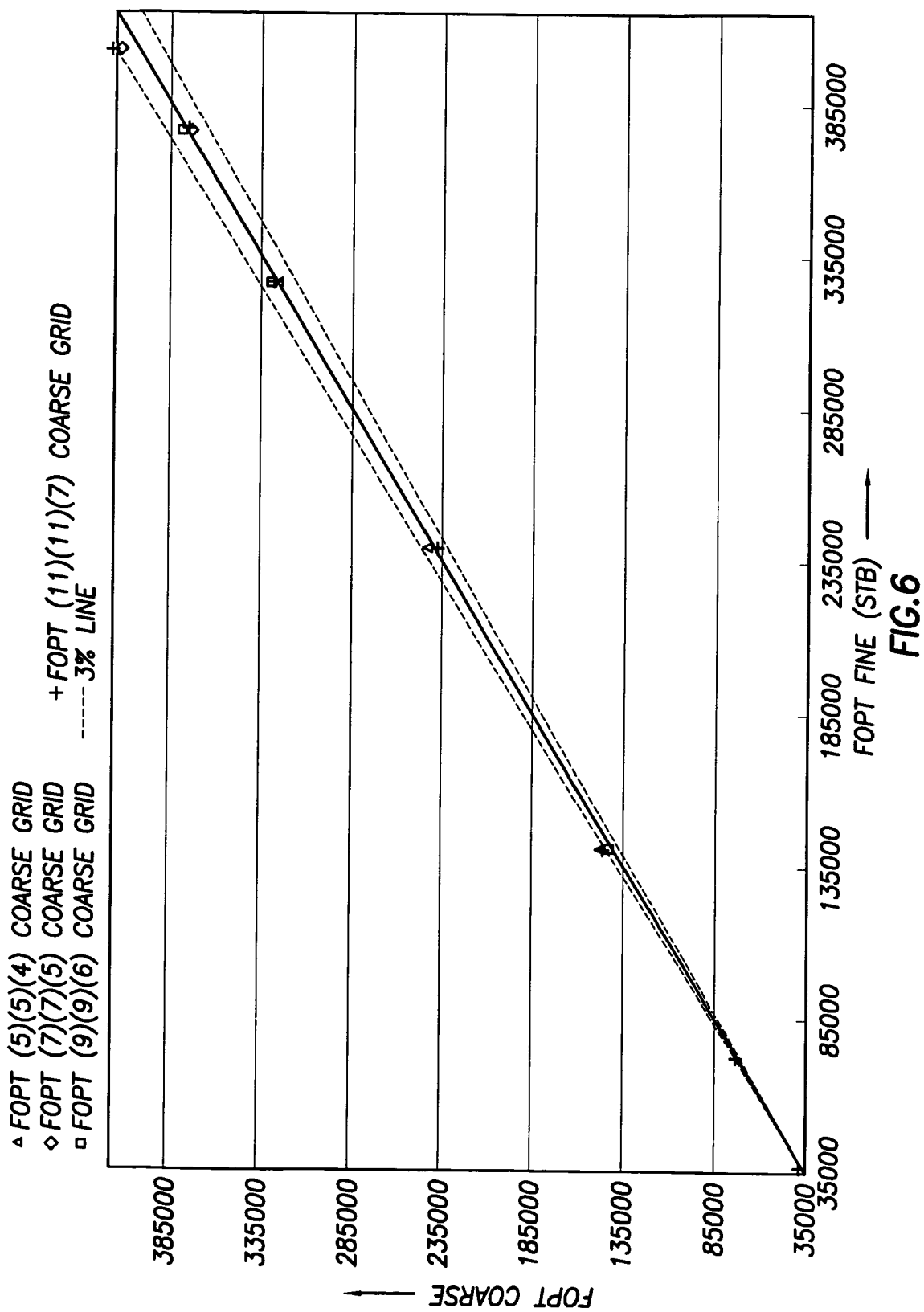
Figure 7:
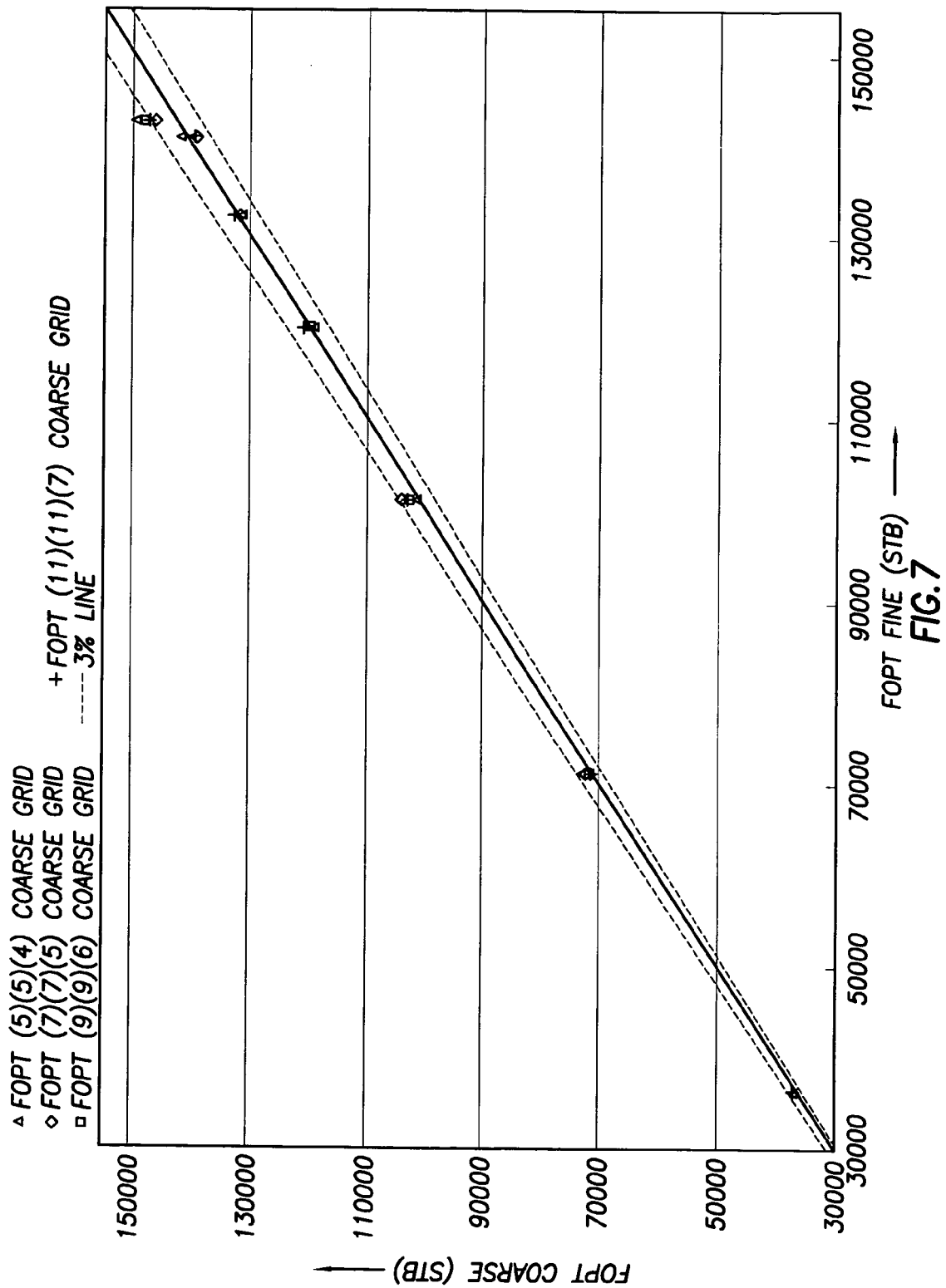
Figure 8:
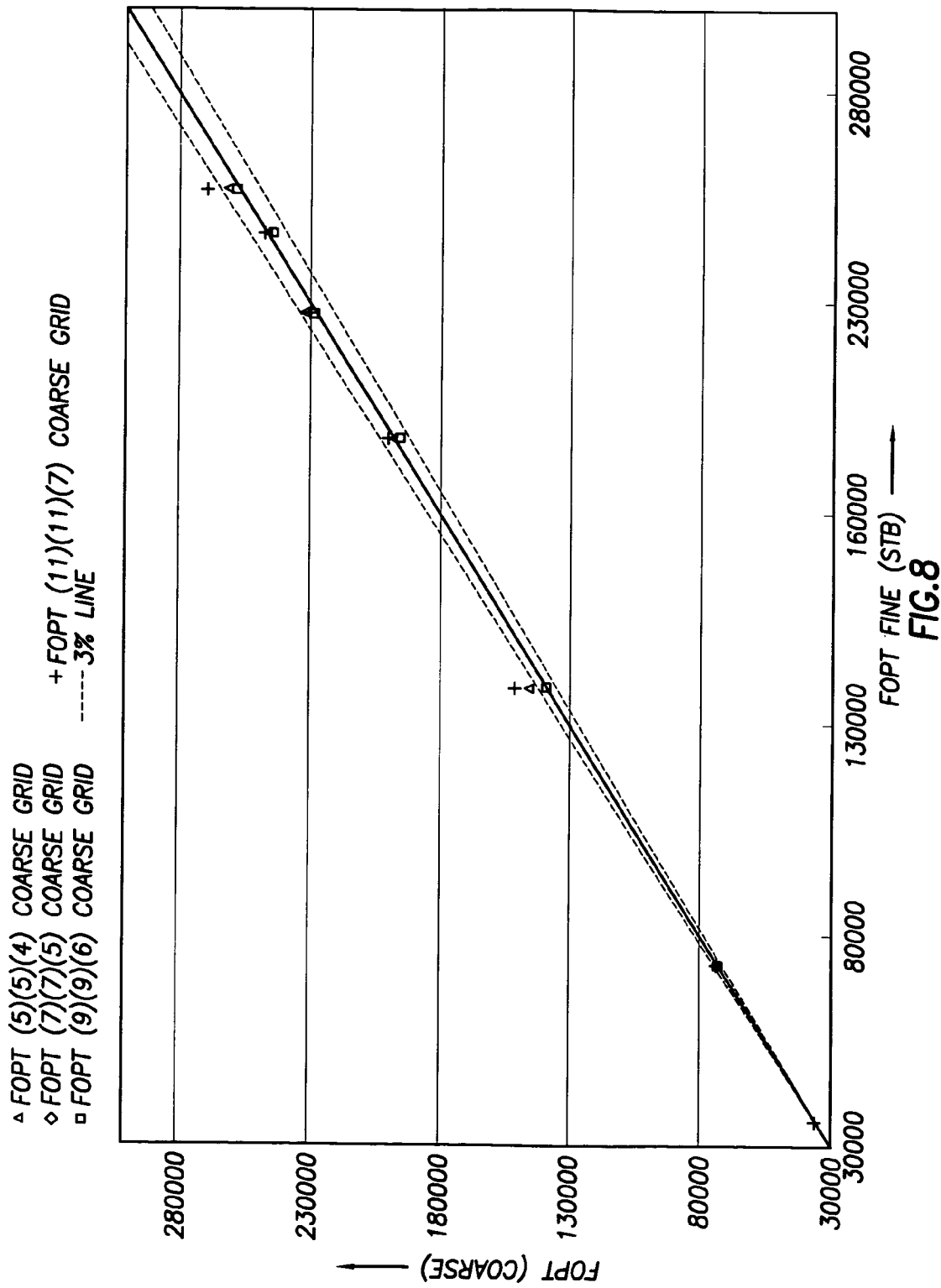

Referring to FIGS. 2 and 3, two constructions of the 'Coarsening Software' 12 of FIG. 1 (which is adapted for replacing all, or parts, of a fine grid with a coarser grid in reservoir simulation models while preserving the accuracy of some predefined 'simulation model outputs') are illustrated. FIG. 2 illustrates a first construction of the 'Coarsening Software' 12 of FIG. 1, and FIG. 3 illustrates a second more detailed construction of the 'Coarsening Software' 12 of FIG. 1.

In FIG. 2, referring to the first construction of the 'Coarsening Software' 12 of FIG. 1, the 'optimal coarse-grid' method disclosed in this specification (which is practiced by the 'Coarsening Software' 12 of FIG. 1 when the 'Coarsening Software' replaces all, or parts, of a fine grid with a coarser grid in reservoir simulation models while preserving the accuracy of some predefined 'simulation model outputs') establishes an 'optimal coarse grid model' by:

(1) Computing a 'training set' on the original fine-grid model, the 'training set' being constructed by computing fine-grid solutions for the derived reservoir output of interest for several different choices of control-variable values, such as a variation in production and injection rates, step 20 of FIG. 2; and (2) Using an Optimizer to find the 'best fit' of the coarse-grid output to those of the 'training set' while adjusting the cell dimensions for a particular grid coarsening, step 22 of FIG. 2. For example, one method for finding the 'best fit' of the coarse-grid output to those of the 'training set', while adjusting the cell dimensions for a particular grid coarsening, includes finding the best 'least squares fit' of the coarse-grid output to those of the 'training set', while adjusting the cell dimensions for a particular grid coarsening. The best 'least squares fit' is known as the "L2 norm".

Recall that step 22 of FIG. 2 uses the optimizer to find the 'best fit' of the coarse-grid output to those of the 'training set', while adjusting the cell dimensions for a particular grid coarsening; and recall further that one example of the use of the optimizer to find the 'best fit' includes using the optimizer to find the best 'least squares fit' (i.e., the L2 norm) of the coarse-grid output to those of the 'training set', while adjusting the cell dimensions for a particular grid coarsening. Note that, while step 22 of FIG. 2 can use the optimizer to find the best 'least-squares fit' of the coarse-grid output to those of the 'training set' (which is defined to be the "L2 norm"), the "L1 norm" or the "L infinity norm" could also be used. However, for purposes of this discussion, and by way of example only, this specification discloses the use of the 'L2 norm' or the best 'least-squares fit', as an example for implementing step 22 of FIG. 2 which recites "finding the 'best fit' of the coarse-grid output to those of the training set while adjusting the cell dimensions for a particular grid coarsening".

The following paragraphs will explain some of the differences between the 'L2 norm', and the 'L1 norm' and the 'L infinity norm'.

A class of vector norms, call a 'p-norm' and denoted $\|\cdot\|_p$, is defined as $$\|x\|_p = (|x_1|^p + \ldots + |x_n|^p)^{\frac{1}{p}}$$
$$p \geq 1, x \in R^n$$

The most widely used are the '1-norm', '2-norm, and '∞-norm':

$$\|x\|_1 = |x_1| + \ldots + |x_n|$$
$$\|x\|_2 = \sqrt{|x_1|^2 + \ldots + |x_n|^2} = \sqrt{x^T x}$$
$$\|x\|_\infty = \max_{1 \leq i \leq n} |x_i|$$

The '2-norm' is sometimes called the Euclidean vector norm, because $\|x-Y\|_2$ yields the Euclidean distance between any two vectors $x,y \in R^n$. The '1-norm' is also called the 'taxicab metric' (sometimes, Manhattan metric) since the distance of two points can be viewed as the distance a taxi would travel on a city (horizontal and vertical movements). A useful fact is that, for finite dimensional spaces (like $R^n$), the three dimensional norms are equivalent. Moreover, all 'p-norms' are equivalent. This can be proved using the fact that any norm has to be continuous in the '2-norm' and working in the unit circle. The '$L^p$-norm' in function spaces is a generalization of these norms by using counting measure.

In view of the above explanation of the differences between the 'L2 norm', the 'L1 norm', and the 'L infinity norm', a typical result is a dramatic reduction in grid dimensions and simulation time while providing a good approximation to the output of interest. The real value of the 'Coarsening Software' 12 of FIG. 1 is realized in 'reservoir optimization problems' where an operator wishes to find the best values of certain 'reservoir control parameters', such as injection and projection rates, in order to maximize such quantities as 'cumulative oil production' or 'net present value'. The 'optimum coarse-grid model' disclosed in this specification allows for a much faster solution time in connection with the aforementioned 'reservoir optimization problem' relative to the solution time that was expended when the original 'fine-grid model' was utilized.

In FIG. 3, a second more detailed construction of the 'Coarsening Software' 12 of FIG. 1 is illustrated. The second more detailed construction of the 'Coarsening Software' 12 of FIG. 1, as illustrated in FIG. 3, includes the following steps and substeps, as follows:

In FIG. 3, step 20 of FIG. 2 (which includes 'computing a Training Set on the original fine-grid model, the Training Set being constructed by computing fine-grid solutions for the derived reservoir output of interest for several different choices of control-variable values, such as a variation in production and injection rates') comprises the following substeps: (1) Set up 'n' sets of production/injection rates, compute corresponding 'Field Oil Production Totals' or 'FOPT' with a 'fine grid', which results in a 'Training Set', and then feed the 'Training Set' to an optimizer, step 24 of FIG. 3, and (2) Decide on dimensions of a 'coarse grid', where an initial guess of 'coarse grid' line positions is established either automatically or by hand, step 26 of FIG. 3.

In FIG. 3, step 22 of FIG. 2 (which includes "Using an Optimizer to find the 'best fit' of the 'coarse-grid' output to those of the 'Training Set' while adjusting the 'coarse grid' cell dimensions for a particular grid coarsening") comprises the following substeps:

(1) Step 28 of FIG. 3: The Optimizer calls a 'reservoir simulator', such as 'Eclipse' (and recall that 'Eclipse' is the simulator that is owned and operated by Schlumberger Technology Corporation of Houston, Tex.), which computes the 'Field Oil Production Total (FOPT)' from the coarse-grid 'n' times and then evaluates the following 'objective function', as follows:

$$ObjFunc = \frac{1}{n} \sum_{i=1}^{n} \left( \frac{FOPT_{FINE,i} - FOPT_{COARSE,i}}{FOPT_{FINE,i}} \right)^2,$$

step 28 of figure 3,

The Objective Function ('ObjFunc') set forth above can be defined as an 'L1 norm' or as an 'Linfinity norm' type for the following reasons: step 28 in FIG. 3 is technically the normalized (1/n) square of the 'L2-norm' (since we are not taking the square root of the sum of squares). But this is just a 'scaling effect'. In step 28 of FIG. 3, one could have used the 'L1-norm' by removing the square exponent and replacing the brackets by absolute value bars |. For the 'Linfinity-norm', one does not normalize by 'n', and, in addition, replace the summation by max over the term in the parentheses without the square exponent (and similarly for any 'p-norm'). In fact, one can define many 'misfit functions' as your 'objective function' for the optimization process.

(2) Step 30 of FIG. 3: Property Upscaling onto coarse grid dimensions (automatically with COARSEN, otherwise hand coded), step 30 of FIG. 3.

In connection with 'Property Upscaling onto coarse grid dimensions', step 30 of FIG. 3, since each 'coarse-grid' cell typically encompasses several 'fine-grid' cells, the material properties of one or more fine-grid cells need to be 'averaged' into each coarse grid cell (hereinafter called 'Material Averaging' or 'Averaging'). Averaging is kept elementary in the implementation of 'optimal gridding'. Simple averaging is employed in order to demonstrate that such basic upscaling is sufficient for achieving a desired objective function in a proxy model. Simple averaging allows the 'Coarsening algorithm' 12 to be applied to a general field case without special tuning and user bias. An Arithmetic averaging can be used for permeability in the x- and y-directions and for porosity in all directions, while Harmonic averaging can be used for permeability in z-direction. Later in this specification, the 'reservoir simulator' COARSEN keyword is used for all averaging. The COARSEN keyword type of averaging is still 'simple averaging', but it yields much better results because it averages not only bulk material properties, such as permeability and porosity, but it also averages transmissibilities. Transmissibility averaging is shown in this specification to be important for achieving good results in the presence of flow restrictions and barriers.

(3) Step 32 of FIG. 3: The Optimizer minimizes the 'Objective Function' (which is denoted as 'ObjFunc' in step 28 of FIG. 3) by changing the grid line positions until:

|ObjFunc$_{i+1}$−ObjFunc$_i$|<*TOL*, step 32 of FIG. 3.

In FIG. 3, following step 32, an 'Optimal Grid' 34 is the result.

In FIG. 3, when the 'Optimal Grid' 34 is generated, validate the coarse grid by Forward Testing it with different production and injection rates, step 36 of FIG. 3.

A functional description of the operation of the 'Coarsening Software' 12 of FIGS. 1, 2 and 3 will be set forth in the following paragraphs with reference to FIGS. 1 through 3 of the drawings.

In FIG. 3, a 'Coarsening software' 12 was developed to establish an optimal coarse grid proxy that can replace all, or parts, of the fine grid with a coarser grid while preserving the accuracy of some predefined simulation model output. The goal is to demonstrate that a proxy coarse-grid model may replace a fine-grid simulation model with a small (and acceptable) difference between the fine and coarse grid for a predefined simulation-model output. This results in a much lower cost per simulation while preserving accuracy on a specific output of the model. In this specification, the output of the simulation model to be preserved is the 'cumulative field oil production', otherwise known as the 'Field Oil Production Total' or 'FOPT'. However, the 'Coarsening Software' 12 does not need to be limited to 'FOPT'. Other outputs of interest for future study include recovery, and NPV.

In FIG. 3, the 'Coarsening Software' 12 of FIGS. 1 and 2 establishes an 'optimal coarse grid' (represented by step 34 of FIG. 3) by: (1) computing a training set of FOPTs based on the original fine grid obtained from several different sets of production and injection rates (step 20 of FIG. 2); the rates used in the training set should encompass the range of values expected to be used by the optimizer; the number of members in the training set was generally taken as equal to the number of optimization variables; and (2) applying an Optimizer (step 22 of FIG. 2) which seeks the best fit to these training set FOPT values while adjusting the cell dimensions to thereby provide a 'particular grid coarsening configuration'. That is, when the training set of step 20 of FIG. 2 has been generated on the 'fine grid', which occurs when execution of step 26 in FIG. 3 has been completed, all subsequent simulations called by the Optimizer are performed on the 'coarse grid'. From the initial coarse grid, the Optimizer of step 22 of FIG. 2 runs a reservoir simulator (such as, the 'Eclipse' reservoir simulator) 'n' times in order to compute 'n' FOPT values on the coarse grid, where the 'n' FOPT values computed on the coarse grid are denoted as: FOPT$_{Coarse}$ (and recall that the 'Eclipse reservoir simulator' is owned and operated by Schlumberger Technology Corporation of Houston, Tex.). These 'n' FOPT values computed on the coarse grid (FOPT$_{Coarse}$) are compared (using the 'ObjFunc' in step 28 of FIG. 3) with the training set values (FOPT$_{Fine}$) in order to obtain an 'Objective Function Value (F)', as indicated by step 28 in FIG. 3. The 'Objection Function' ('ObjFunc'=F) of step 28 in FIG. 3 is set forth again as follows:

$$F = \frac{1}{n}\sum_{i=1}^{n}\left(\frac{FOPT_{Fine,i} - FOPT_{Coarse,i}}{FOPT_{Fine,i}}\right)^2$$

After the Objective Function ('ObjFunc'=F) is obtained, in a 'Property Upscaling' step (step 30 of FIG. 3), since each 'coarse-grid' cell typically encompasses several 'fine-grid' cells, the material properties of one or more fine-grid cells need to be 'averaged' into each coarse grid cell (called 'Material Averaging' or 'Averaging'). An Arithmetic averaging can be used for permeability in the x- and y-directions and for porosity in all directions, and Harmonic averaging can be used for permeability in z-direction. However, for best results, the 'reservoir simulator' COARSEN keyword is used for all averaging. The 'reservoir simulator' COARSEN keyword is defined, as follows: the COARSEN keyword is still 'simple averaging', however, it yields much better results because it averages not only bulk material properties, such as permeability and porosity, but it also averages transmissibilities. That is, the 'COARSEN keyword' method of 'Material Averaging' allows for a consistent yet simple averaging for permeability, porosity, and transmissibility across the reservoir.

The optimizer then updates the cell dimensions in the 'coarse grid' and repeats the procedure until convergence of the 'Objective Function Value (F)' is achieved, and convergence of the 'Objective Function' (ObjFunc) is achieved when step 32 of FIG. 3 is satisfied; that is, convergence of the Objective Function 'ObjFunc' is achieved when the following equation is satisfied: |ObjFunc$_{i+1}$−ObjFunc$_i$|<TOL, step 32 of FIG. 3.

The 'Objective Function Value (F)' is obtained from an 'Optimization Objective Function (F)' that has the following form:

$$ObjFunc = F = \frac{1}{n}\sum_{i=1}^{n}\left(\frac{FOPT_{Fine,i} - FOPT_{Coarse,i}}{FOPT_{Fine,i}}\right)^2,$$

where 'n' is number of cases in the training set. As a result of the 'n' in the 'Optimization Objective Function (F)', the 'Optimization Objective Function (F)' requires 'n' fine-grid simulations to be run in order to establish a basis for comparison.

Recall that the Objective Function ('ObjFunc') set forth above can be defined as an 'L1 norm' or as an 'Linfinity norm' type for the following reasons: step 28 in FIG. 3 is technically the normalized (1/n) square of the 'L2-norm' (since we are not taking the square root of the sum of squares). But this is just a 'scaling effect'. In step 28 of FIG. 3, one could have used the 'L1-norm' by removing the square exponent and replacing the brackets by absolute value bars |. For the 'Linfinity-norm', one does not normalize by 'n', and, in addition, replace the summation by max over the term in the parentheses without the square exponent (and similarly for any 'p-norm'). In fact, one can define many 'misfit functions' as your 'objective function' for the optimization process.

In this specification, a tensor-product grid parameterized the averaging of fine-grid cells into the coarse grid; that is, averages requested along the i, j, and K axes are propagated into the interior of the grid. This reduces the number of optimization variables to the sum of the number of averages needed along each of the axes, a much smaller number of variables than is needed to average each grid cell independently in three dimensions.

As mentioned earlier, in connection with 'Optimal Gridding and Upscaling', since each 'coarse-grid' cell typically encompasses several 'fine-grid' cells, the material properties of one or more fine-grid cells need to be averaged into each coarse grid cell. Averaging was kept elementary in our initial implementation of optimal gridding. Simple averaging was employed because we want to demonstrate that such basic upscaling is sufficient for achieving our desired objective function in a proxy model. Simple averaging allows the 'Coarsening algorithm' 12 to be applied to a general field case without special tuning and user bias. Initially, arithmetic average was used for permeability in the x- and y-directions and for porosity in all directions, while harmonic averaging was used for permeability in z-direction. Later in this specification, we switch to using the 'reservoir simulator' COARSEN keyword for all averaging. This is still simple averaging, but it yielded much better results because it averages not only bulk material properties, such as permeability and porosity, but it also averages transmissibilities. Transmissibility averaging is shown in this specification to be important for achieving good results in the presence of flow restrictions and barriers. Nevertheless, it is acknowledged that more elaborate upscaling might yield slightly better results.

In connection with 'Automatic Cell Coarsening', the reservoir simulator COARSEN keyword automatically performs all the desired volume-property, transmissibility averaging and adjustments to wells within coarsened cells, thereby granting more flexibility and convenience. The COARSEN keyword lumps a three-dimensional box (in terms of cell i-j-K specifications) of fine grid cells into a single coarse-grid cell. The reservoir simulator pre-processor performs all averaging necessary for this automatically. It allows multiple wells to be lumped into a single pseudo-well and adjusts connection factors accordingly. The COARSEN keyword, however, cannot average fractional cells. This required us to switch from a continuous optimizer to a discrete (integer) optimizer. The program workflow (with the COARSEN keyword) was similar to those considered previously: calibration points must be specified, a coarsening defined and then the optimizer is run to determine the optimal position of the coarsened gridlines. Preliminary tests found that the differential evolution algorithm provided the most accurate results. After applying the method to a synthetic field, the 'Coarsening algorithm' 12 was tested on a small Canadian gas field containing six producers and 4 injectors with a corner point grid representation. In a first pass, the grid cells containing wells and all the corresponding rows and columns in i and j were locked (not allowed to be coarsened) and only the remaining blocks in between these fixed rows and columns were allowed to be coarsened. However, this severely limited the number of valid grid coarsening, denying the optimizer the flexibility to achieve good results. Not unexpectedly, only mediocre results were found. The strategy for improving these results included removing the constraints on cells containing wells, allowing the optimizer to coarsen over the whole field regardless of whether the cell being coarsened contained a completion. The reservoir simulator COARSEN keyword took care of all the necessary upscaling and computation of connection factors. This produced very good results with all errors being less than one percent. The resulting coarsened grids were found to refine around the oil-bearing region of the field, maintaining resolution only where needed.

As a result, simulation performance is crucial when tackling reservoir optimization problems. Reservoir simulation models often involve detailed grids with correspondingly long simulation run times and this downside is magnified when the reservoir simulator is repeatedly called as in forecasting reservoir optimization. The 'Coarsening Software' 12 disclosed in this specification demonstrates that a proxy coarse-grid model might replace a fine-grid simulation model with only a small difference between the fine-and coarse-grid results for a predefined simulation-model output. This resulted in a much lower cost per simulation while preserving accuracy on a specific output of the model.

In the following paragraphs of this specification, the 'Downhill-Simplex (Nelder and Mead)' Optimization Algorithm and the 'Differential Evolution' Optimization Algorithm are discussed, the 'Downhill-Simplex' Optimization Algorithm and the 'Differential Evolution' Optimization Algorithm being the two Optimization Algorithms that are used in the bulk of the above discussion involving the 'Coarsening Software' 12 of FIGS. 1, 2, and 3.

However, in later paragraphs of this specification, various additional 'Optimization Algorithms' (other than the 'Downhill-Simplex' and the 'Differential Evolution' Optimization Algorithms) will be discussed with reference to FIGS. 1.1, 1.2, 1.3, 1.4, 2.1, 2.2, 2.3, 2.4, 2.5, 2.6, 2.7, 2.8, and 2.9 of the drawings.

'Downhill-Simplex' Optimization Algorithm:

The downhill-simplex method (from Nelder and Mead) is a multidimensional gradient-free minimization routine that finds a local minimum of a function with one or more independent variables. SDR has extended the original unconstrained algorithm to treat bounds and linear constraints. In an N-dimensional problem (N optimization control variables), a simplex is defined with N+1 vertices. The objective function is evaluated at each vertex of the simplex. Subsequently, the simplex is updated by means of reflection through a face or expansion or contraction about a vertex in an attempt to bring the optimum (minimum) point into the interior of the simplex. Finally it will contract itself around a minimum that is found. Convergence occurs when the vertices are all within a small neighborhood of each other or when the objective function values at the vertices are sufficiently close to each other.

'Differential Evolution' Optimization Algorithm:

Differential Evolution is a stochastic optimization algorithm that uses adaptive search based on an evolutionary model. A population of potential solutions is initialized. Analogous to 'survival of the fittest', bad solutions will be dropped out, and, within one iteration, good solutions will breed among each other. These will cross over with a predefined target vector and produce a trial vector. If this trial vector results in a minimized objective function, it will be accepted into the next generation Upscaling with 'Coarsen'

The reservoir simulator can upscale grid properties automatically through the COARSEN keyword. This coarsens specified fine-grid cells into a single coarse-grid cell. COARSEN will amalgamate all fine cells present in the volume specified, compute the upscaled properties and assign them to a representative cell in the middle of the coarsened volume. If wells are present, their completions will be moved to the representative cell and the reservoir simulator will calculate new connection factors.

The reservoir simulator upscales in the following way:

Pore Volume:

$$PV_{Coarse} = \sum_1^n PV_{fine}$$

Depth:

$$D_{Coarse} = \frac{\sum_1^n PV_{Fine} \cdot D_{Fine}}{PV_{Coarse}}$$

DX, DY, DZ:

$$DX_{Coarse} = \frac{\sum_i^n DX_{Fine}}{(J_2 - J_1 + 1) \cdot (K_2 - K_1 + 1)},$$

analogous for DY and DZ PERMX, PERMY, PERMZ:

$$K_{Coarse}^X = \frac{\sum_1^n PV_{Fine} \cdot K_{Fine}^X}{PV_{Coarse}},$$

analogous for PERMY and PERMZ TOPS:

$$TOPS_{Coarse} = \frac{\sum_1^n PV_{Fine} \times \overline{TOPS_{Fine}}}{PV_{Coarse}}$$

TRANX, TRANY, TRANZ:

$$TRANX_{Coarse} = \sum_J \sum_K \frac{1}{\left[\sum_I \frac{1}{TRANX_{Fine}}\right]},$$

analogous for TRANY and TRANZ where n is the number of fine cells in the coarsened cell.

Upscaling in this manner is more rigorous and comprehensive than discussed earlier. It is also more flexible as it can be applied to any field, while in the previous approach the code was set up for specific field geometry.

The COARSEN keyword, however, requires the coarse cell boundaries to precisely coincide with fine grid cell boundaries. For this reason an integer optimizer is needed as cells are declared as integer indices.

The code workflow with the COARSEN keyword is similar to that discussed previously: a certain amount of calibration points need to be specified, a volume to-be coarsened needs to be identified and the dimensions of coarsening are defined. The optimizer will find the optimal position of the coincident gridlines.

When performing first basic tests with the new code, three different integer optimizers were evaluated and their performance compared. These optimizers were: Nelder-Mead (in its integer form), differential evolution and simulated annealing.

Figure 4:
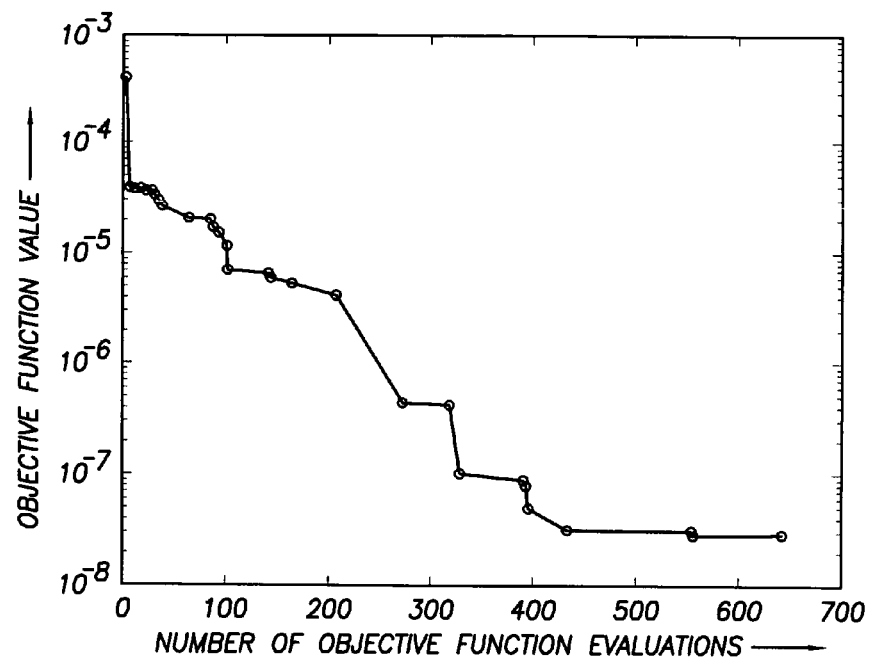
Figure 4:
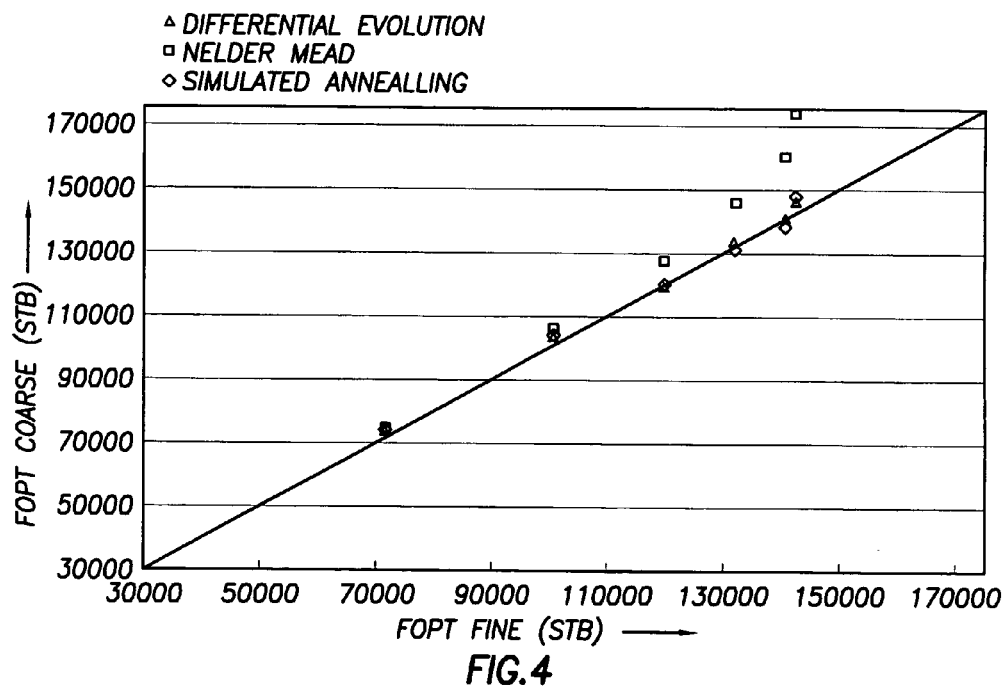

Refer now to FIG. 4.

FIG. 4 illustrates the clear deviation of the integer Nelder-Mead algorithm art large FOPT values. The results from the simulating annealing routine were quite close to those obtained using differential evolution and both optimizers took roughly the same computation time. It was therefore decided to use the slightly more accurate differential evolution routine for this analysis.

Results

Refer to FIGS. 5, 6, 7, and 8.

In order to test and validate this new approach, the two models with flow restrictions were once again tested, with homogeneous and heterogeneous properties respectively. FIGS. 5, 6, 7, and 8 show the scattering of FOPT for the four cases. Errors of about 3% were observed, but sometimes less. It was also observed that errors increase with increasing FOPT. This is thought to result because small FOPT values are reasonably easy to accommodate for a number of different grid geometries (the model is able to deliver the required value). With higher FOPT, there are fewer (if any) suitable grid configurations. This is the point where either the optimizer routine or the coarse grid will fail to provide satisfactory results and can be conceived as the functional (feasible) limit of the coarse-grid proxy.

Field Example

In the previous sections the principal capabilities of the algorithm are described. We provide several synthetic examples demonstrating that coarse-grid proxies exist for fine-grid models, both with and without flow restrictions. Nevertheless the [51][51][10] model used is very simplistic. In order to better demonstrate the proxy algorithm potential and functionality it was applied to actual field examples.

Field Case #1

Figure 9:
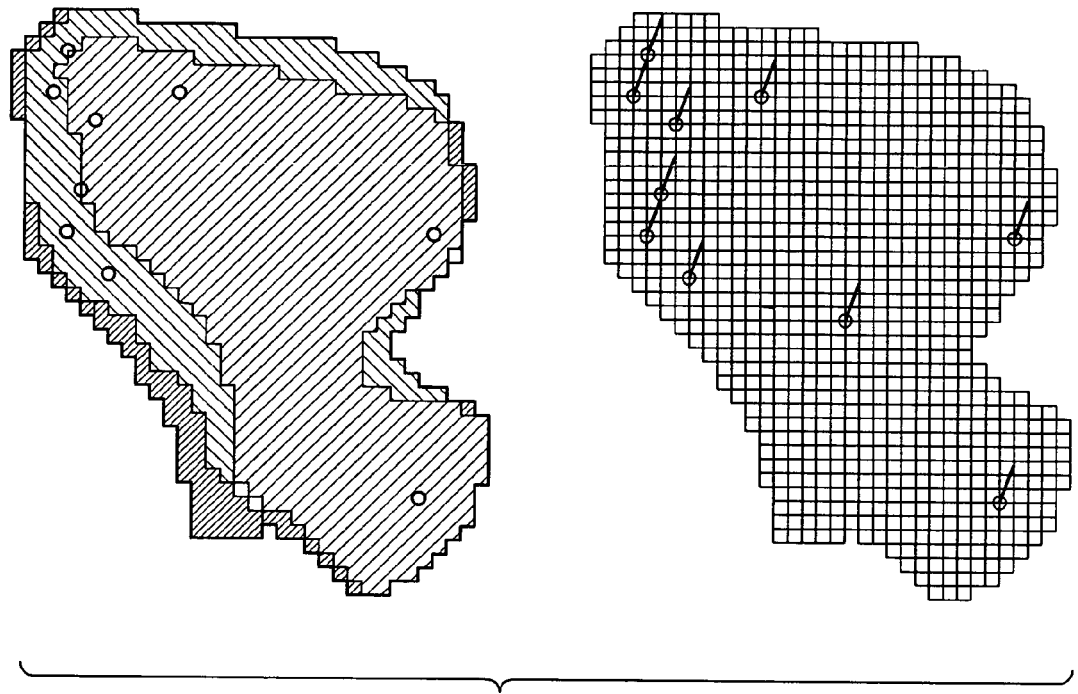

Refer now to FIG. 9.

In FIG. 9, field case #1—a small onshore field located in Canada. Originally a gas field, it started production in the late 1970's, but was redefined as an oil field when oil was discovered on Western rim in the late 1990's (as can be seen in FIG. 9). It contains ten wells: four oil producers and six gas injectors. Three of the producer wells are horizontal wells with advanced completions for variable inflow along three separate portions of its completed length. The field is unfaulted, but some pinch-outs exist on the flanks. The field is described using a corner-point grid allowing grid deformation to better match reservoir geometry.

First Approach

Figure 10:
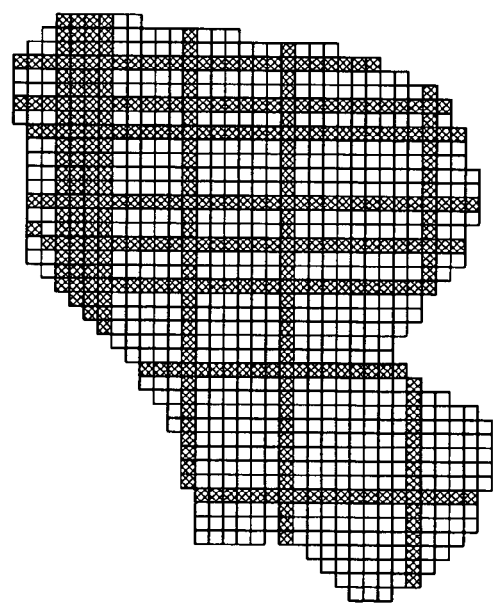

Refer now to FIG. 10.

In FIG. 10, in order to keep the appropriate well connection factors, it was decided to lock the cells containing wells, i.e., the rows and columns containing completions were not coarsened. This means that the entire row and column containing a completion must be locked so that we can employ a tensor-product grid coarsening. Thus only the rectangular regions between the locked down cells are to be coarsened (see FIG. 10).

One could leave the rectangles blank for a coarsest solution, but that wouldn't allow any degrees of freedom for optimization, thus the coarsest version we consider is one where there are two free gridlines in every rectangular region, one horizontal and one vertical. The code was set up in such a way that one could define beforehand how many gridlines should be put into each available up-scalable region in each direction. Because it was not clear what impact the horizontal wells would have on the gridding procedure they were all re-defined as vertical wells in the first pass.

Figure 11:
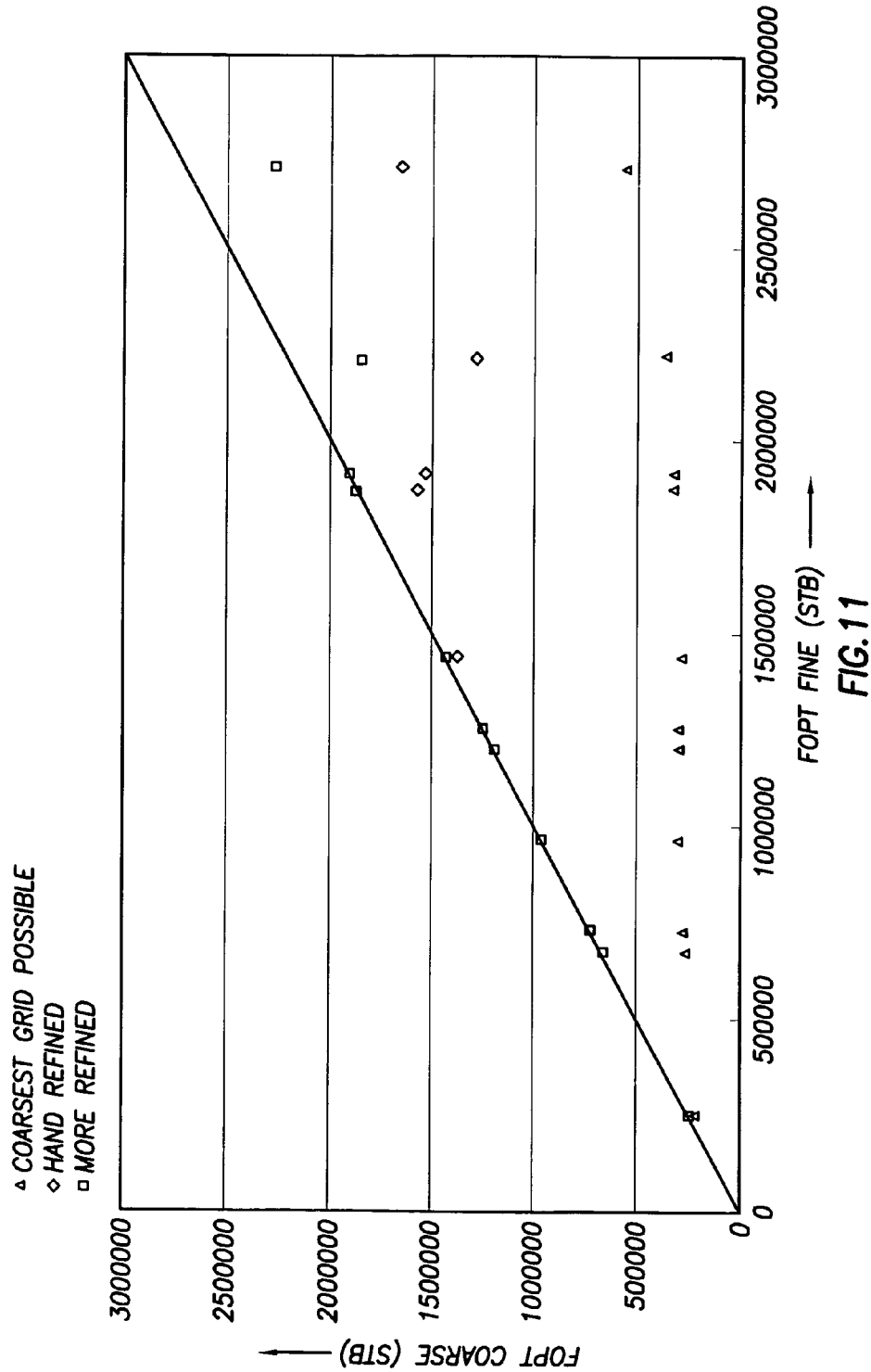

Refer to FIG. 11.

FIG. 11 shows clearly that this approach is not very successful. The pink dots are the results from the coarsest possible grid as discussed above; the average error is about 85 percent. Subsequently the regions chosen for refinement were based on size and proximity to wells. The finer version performs well up to about 1,500,000 STB but starts then deviates markedly. Only a small improvement on this behavior can be achieved by a further refining step. At this point, the possibilities for further refining were more or less fully utilized since the biggest region available for up-scaling was only [8][8] (see FIG. 10). Another possibility would have been to lock down just the cells with wells, without fixing the entire row and column—however this would have required changing the code and solving for more variables. Due to these limitations it was decided to no longer consider this avenue of analysis. Its failure is most probably due to just too many cells being locked-down (too little room for refinement).

Second Approach

Figure 12:
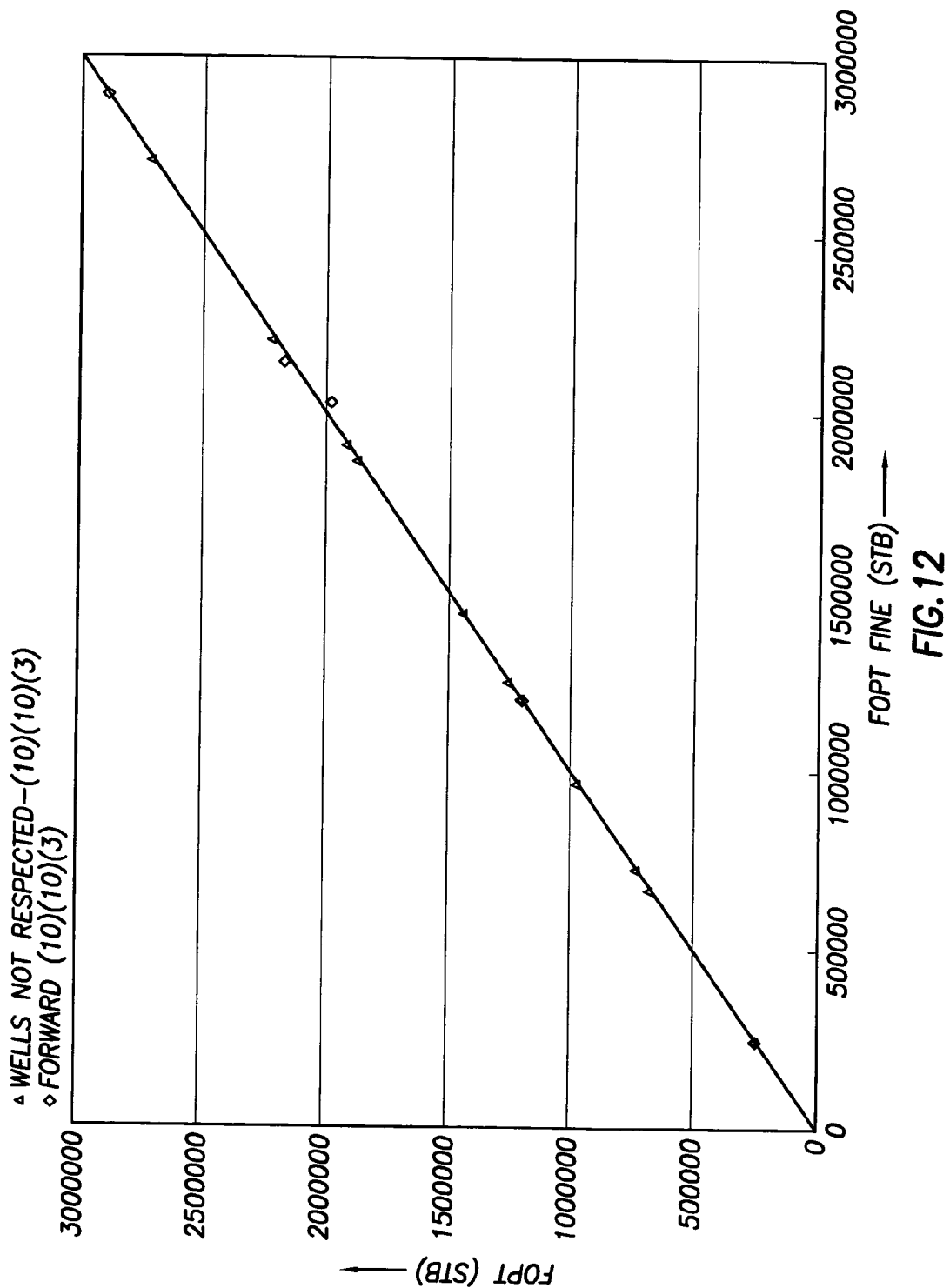

Refer to FIG. 12.

In FIG. 31, this approach the cells containing wells are not locked down. The optimization can consider the whole field (not selective and confined regions as discussed previously). This approach provided excellent results. The original grid dimensions of field case #1, [39][46][5] were replaced with [7][7][3], [10][10][2] and [15][15][3] grids with results shown in FIG. 12. It can be seen how FOPT values match almost exactly (something not seen in previous tests).

Nevertheless, when a test was run with only two layers in the z-direction, the optimizer was unable to converge within our preset maximum number of iterations as there were too few layers to describe the physics of the system. The good results exhibited can be explained by the way COARSEN rigorously considers material and transmissibility averaging as well as well placement. Thus by having the whole field available for coarsening, the optimization code is given greater flexibility to find a good solution.

Figure 14:
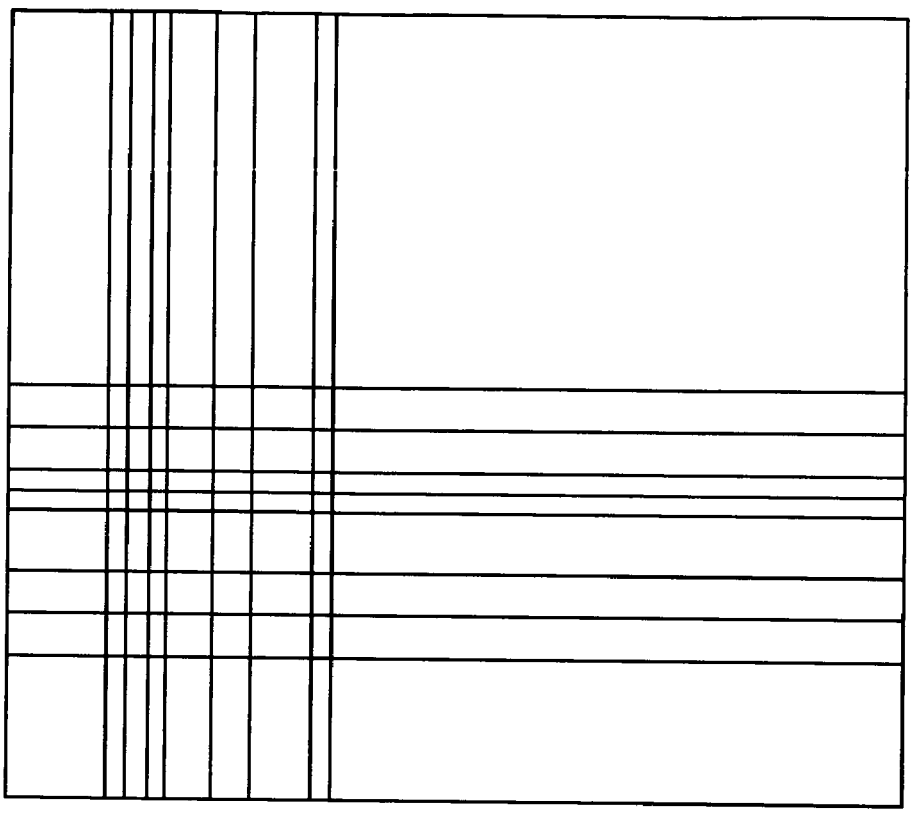
Figure 13:
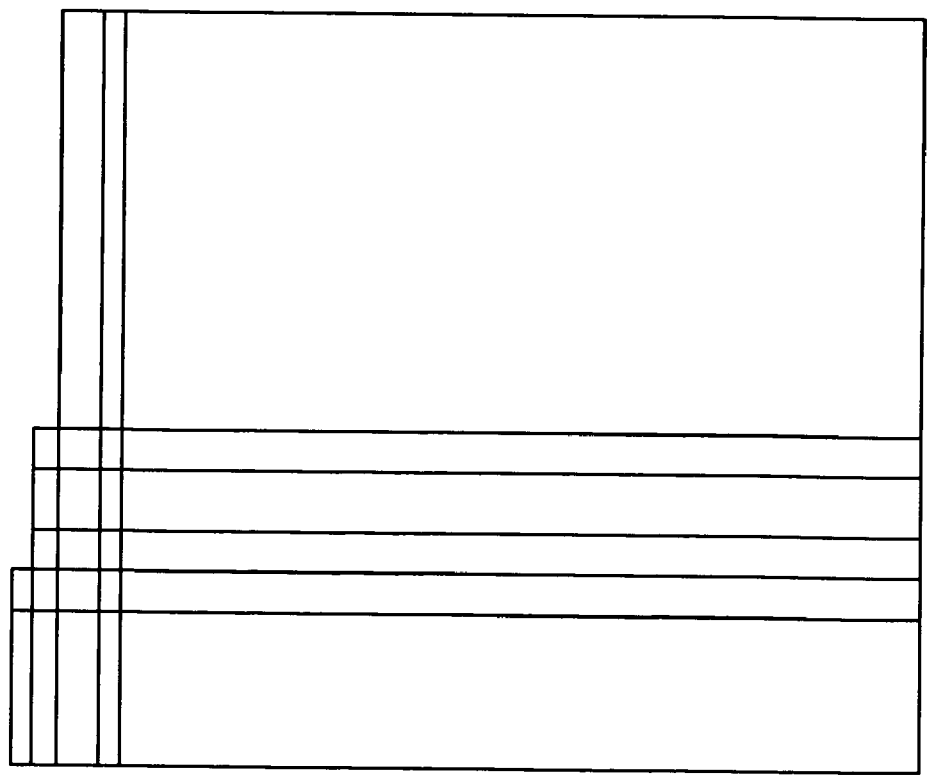
Figure 15:
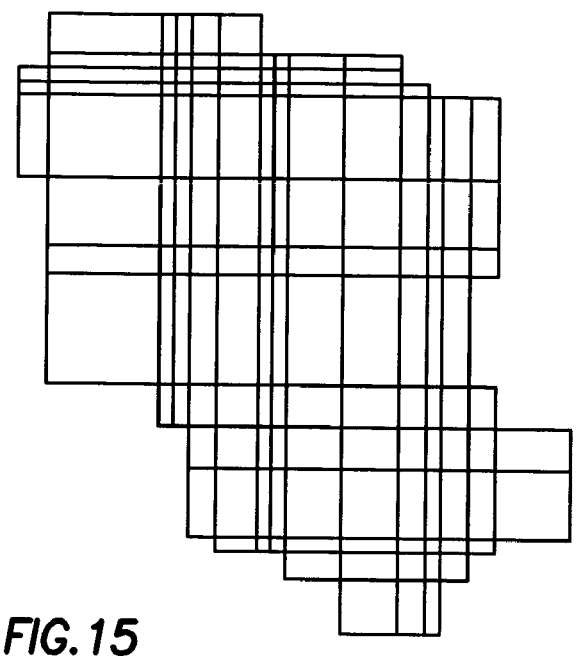

Referring to FIGS. 13, 14, and 15, the resulting coarsened grids are shown in FIGS. 13, 14, and 15.

In FIGS. 13, 14, and 14, one may notice that the actual number of gridlines in the coarsened models is not as many as implied in their title. This is because there are inactive cells, which are not displayed, around the edge of the field. In the [7][7][3] case, the grid is so coarse that Eclipse collapsed (amalgamated) several wells into a single representative cell. When this is done, COARSEN preserves the different flow rates. As the grid is further refined, it can be seen how the wells are separated and are put in roughly the same places as in the fine grid.

Horizontal Wells

Figure 16:
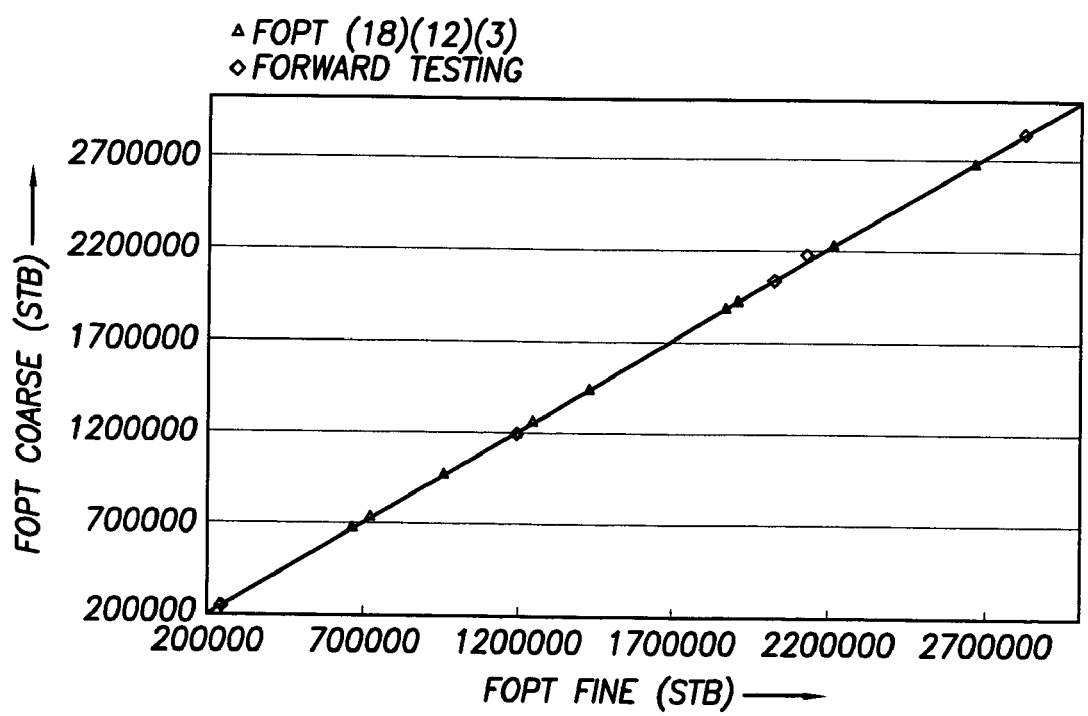
Figure 17:
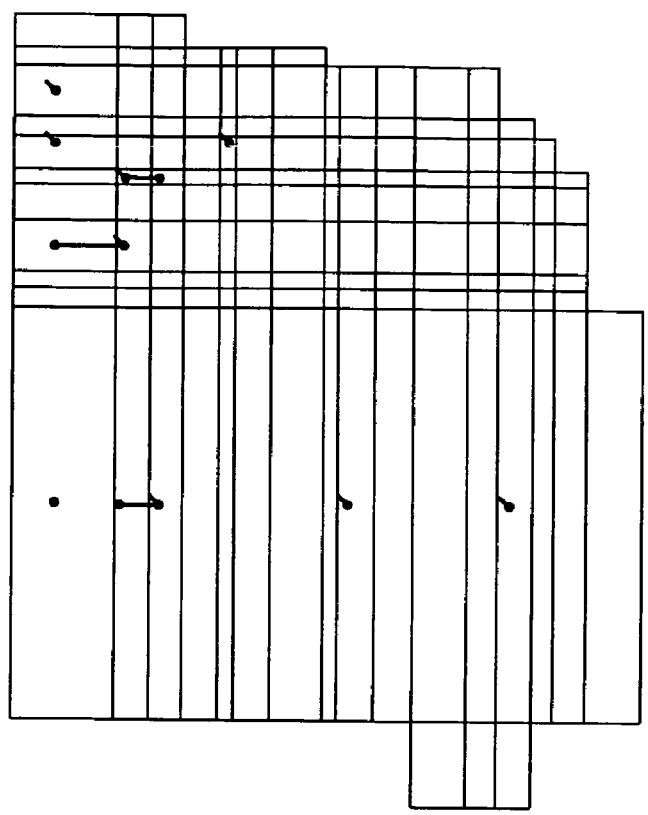

Refer to FIGS. 16 and 17.

Thus far, this approach worked well on vertical wells. In FIG. 16, when the original horizontal wells were reintroduced, the results obtained are shown in FIG. 16. In FIG. 17, however, FIG. 17 shows the resulting grid and well configuration. The grid dissects the horizontal wells and splits them into two grid blocks, but after investigation, this was found not to have a detrimental effect on the results.

Optimization Time

The default accuracy setting within 'Mathematica' is half the machine precision, which is higher than necessary for our problem. With this very fine resolution, optimal grid positioning took around 12 hours to complete. It was not quite clear how to change this particular setting, but it is believed that by doing so the optimization time can be strongly reduced.

Field Case #2

Figure 18:
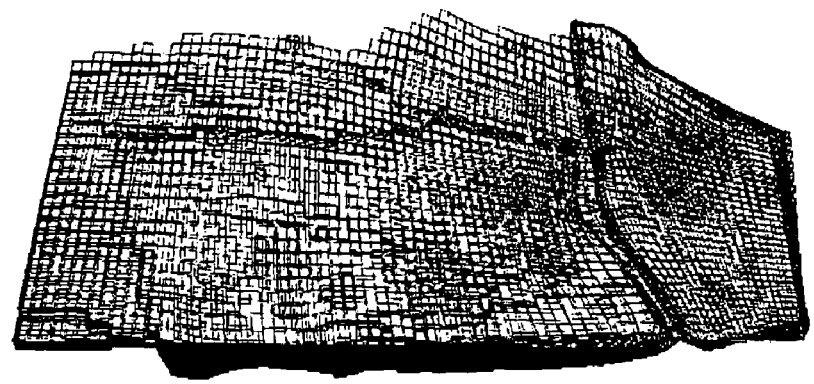

Refer now to FIG. 18.

In FIG. 18, field case #2 (a field offshore Norway, North Sea) contains several large displacing faults (which are clearly visible) and is connected to an aquifer. The wells (some horizontal) are operating very close to (but not below) bubble point. During the optimization, however, as a consequence of the coarsening of the grid, pressure could not always be maintained above this critical value since pressures are not part of the objective function. Consequently, when bottom hole flowing pressure fell below bubble point, wells were (correctly) instructed to shut down. This was observed almost immediately after the first time step (half a year). Due to this restraint, no real optimization could be undertaken on the initial model. Since no coarsening could be found which satisfies the bubble-point constraint, it may be the case that this model is already in its coarsest possible state.

Referring to FIGS. 1.1, 1.2, 1.3, 1.4, 2.1, 2.2, 2.3, 2.4, 2.5, 2.6, 2.7, 2.8, and 2.9, various other Optimization algorithms will now be discussed below with reference to FIGS. 1.1, 1.2, 1.3, 1.4, 2.1, 2.2, 2.3, 2.4, 2.5, 2.6, 2.7, 2.8, and 2.9 of the drawings.

Optimization problems involving reservoir simulation require a large computational effort to be invested in the evaluation of reservoir model. The model is evaluated repeatedly by the optimizer and the total simulation run time is the dominant part of the overall optimization run time. Thus a good model for simulation-based reservoir optimization must satisfy two conflicting properties:

1. The model must be computationally inexpensive.
2. The model must be accurate enough to represent the actual physics of the reservoir.

The property of the reservoir model which governs the computational complexity of the simulation is the level of coarseness of the grid on which the PDEs are solved. Thus for a given level of coarseness (computational complexity) we can define the optimal reservoir coarse-grid model as the one which gives the best accuracy among all the possible coarse grids. The term accuracy can be defined in several different ways resulting in different objective function for the coarse grid optimization.

The goal of the research is to find an appropriate way to determine an optimal coarse grid which significantly reduces the computational cost of the reservoir model while preserving reservoir physical behavior. The optimal coarse grid can then be used for the problems where multiple evaluations of the reservoir model are required reducing the total simulation run time.

1.1 Objective Function

The quantity to be preserved in the coarse-grid model is FOPT (Field Oil Production Total). The input parameters of the reservoir model are the flow rates for the production and injection wells. Since it is impossible to evaluate a coarse grid model for all possible flow rates, the training set approach is used. A training set is a set of points in the space of flow rates which represents a typical and physically sensible input for the reservoir model. The objective function is chosen to be a fit of these points in some sense.

The first choice of the objection function is as follows: Consider a set of $N_{calibration}$ points in the space of flow rates. For each of these points the fine grid model is evaluated which gives the FOPT as a function of time $FOPT_j^{fine}(t), j=1, \ldots, N$, $t \in [T_{min}, T_{max}]$, where $T_{min}$ and $T_{max}$ determine the time interval of the simulation. For a given coarse grid model the FOPT is $FOPT_j^{coarse}(t), j=1, \ldots, N_{calibration}, t \in [T_{min}, T_{max}]$. The objective function is a least squares fit of the FOPT over the set of training points $$F_2 = \frac{1}{N_{calibration}} \sum_{j=1}^{N_{calibration}} \left( \frac{FOPT_j^{fine}(T_{max}) - FOPT_j^{coarse}(T_{max})}{FOPT_j^{fine}(T_{max})} \right)^2,$$

The obvious downside of such choice of the objective function is that it only captures the FOPT at the final time of the simulation and does not take into account the evolution of the FOPT over the time. Since $FOPT(T_{max})$ is an integral value of FOPR (Field Oil Production Rate): $FOPT(T_{max}) = \int_{T_{min}}^{T_{max}} FOPR(t)dt$, completely different profiles of FOPR can give the same values of FOPT. Some of these FOPRs can be non-physical and still provide a good fit to the FOPT $(T_{max})$. Since we cannot afford an exhaustive search over all possible coarse grids our optimization algorithm can be trapped in the neighborhood of such a non-physical point which can be locally optimal.

To address the above issue we introduce the second choice of the objective function. In the above definitions it takes the form $$F_* = \frac{1}{N_{calibration}} \left\| \frac{\|FOPT^{fine}(t) - FOPT^{coarse}(t)\|_*}{\|FOPT^{fine}(t)\|_*} \right\|_{**},$$

where $\|\ldots\|^*$ is a functional norm and $\|\ldots\|^{**}$ is a discrete norm. Since the values of FOPT(t) are available only at discrete time points $t_i$ (the simulation time steps) the norm $\|\ldots\|^*$ is also a discrete norm. For the purposes of this study both norms were chosen as 1-norm, which is the strongest discrete p-norm (the norm with the smallest unit ball). This choice gives us the following expression for the objective function $$F_1 = \frac{1}{N_{calibration}} \sum_{j=1}^{N_{calibration}} \frac{\|FOPT_j^{fine}(t) - FOPT_j^{coarse}(t)\|_1}{\|FOPT_j^{fine}(t)\|_1},$$

where $$\|G(t)\|_1 = \sum_{i=0}^{n} |G(t_i)|,$$

for some function $G(t)$ defined on a discrete set $\{t_i\}_{i=0}^n$. Here $t_i$ are the moments of time at which FOPT values are computed by the simulator.

Such choice of the objective function provides a more strict fit to the fine grid data since it takes into account the evolution of FOPT over the time.

1.2 Optimization Variables

In reservoir simulation the region occupied by the reservoir is topologically equivalent to a 3D parallelepiped, which is a tensor product of three intervals I×J×K. A tensor-product grid is used for the underlying finite-difference solver. The elements of the grid (grid cells) can be defined by a tensor product of three sets of non-overlapping (can only share an end point) intervals $S_I$, $S_J$ and $S_K$. Each set of intervals corresponds to one coordinate direction i, j and K. The union of the intervals corresponding to one coordinate direction must satisfy $\cup_{s \in S_I} s = I, \cup_{s \in S_J} s = J, \cup_{s \in S_K} s = K$, which means that each set of intervals is a splitting of the corresponding big interval.

A splitting of the interval L of length l can be specified in two different ways.

The first option is to specify the lengths $l_q \geq 0$ of the intervals in the splitting. In this case the sum of the lengths of small intervals should be equal to the length of a big interval $$\sum_{q=1}^{n} l_q = L,$$

where n is the number of intervals in the splitting.

The second approach is to specify the positions of the points $\chi_q \in L$ which split the interval. If the set $\{\chi_q\}_{q=1}^{n-1}$ is ordered, then $\cup_{q=0}^{n}[\chi_q, \chi_{q+1}] = L$, where $\chi_0$ is the leftmost point of L and $\chi_{n+1}$ is the rightmost point of L.

When we consider the optimal griding problem for a tensor product grid the optimization variables should correspond to the splittings of the intervals I, J and K which specify the domain of the reservoir. For a given grid the material properties (porosity, permeability, etc.) should be computed. Since the initial model of the reservoir is given in the form of a fine-grid model the usual way to compute the material properties is to do averaging. The form of averaging supported by the ECLIPSE simulator is offered through the COARSEN keyword functionality. It was shown [1] that the COARSEN keyword provides better results than the other averaging methods since ECLIPSE also averages the transmissibilities. The main restriction of the COARSEN keyword functionality is that ECLIPSE cannot average fractional fine grid cells. The averaging can be done only for the coarse grid cells which consist of several fine grid cells. This means that the set of points corresponding to the coarse grid splitting must be a subset of the set of points which define a fine grid splitting. This transformation takes us into the realm of discrete (integer) optimization.

Remark. From this point on the notation is as close to the source code as possible.

Consider the fine grid with the dimensions $N_I^{fine} \times N_J^{fine} \times N_K^{fine}$ grid cells. The coarsened grid satisfying the COARSEN keyword restrictions can be defined in two ways similar to those described above for the continuous splitting.

Coarse grid cell width approach. This approach describes the splitting of each of the three (discrete) intervals [1, $N_I^{fine}] \cap N$, [1, $N_J^{fine}] \cap N$ and [1, $N_K^{fine}] \cap N$ in terms of lengths $dI_i$, $dJ_j$ and $dK_K$ of subintervals, where $dI_i \in [1, N_I^{fine}] \cap N$, $i=1, \ldots, N_I^{coarse}$, $dJ_j \in [1, N_J^{fine}] \cap N$, $j=1, \ldots, N_J^{coarse}$, $dK_k \in [1, N_K^{fine}] \cap N$, $k=1, \ldots, N_K^{coarse}$. Since the union of the subintervals must be equal to the whole interval, three linear equality constraints are added:

$$\sum_{i=1}^{N_I^{coarse}} dI_i = N_I^{fine},$$

-continued $$\sum_{j=1}^{N_J^{coarse}} dJ_j = N_J^{fine},$$

$$\sum_{k=1}^{N_K^{coarse}} dK_k = N_K^{fine}.$$

We can drop one cell width in each of the sets $dI_i$, $dJ_j$ and $dK_K$ (the last one) and convert the linear equality constraints to the much more tractable (from the optimization point of view) inequality constraints:

$$\sum_{i=1}^{N_I^{coarse}-1} dI_i \leq N_I^{fine} - 1,$$

$$\sum_{j=1}^{N_J^{coarse}-1} dJ_j \leq N_J^{fine} - 1,$$

$$\sum_{k=1}^{N_K^{coarse}-1} dK_k \leq N_K^{fine} - 1.$$

Bookmark approach.

In this case the splitting of the intervals [1, $N_I^{fine}$]∩N, [1, $N_J^{fine}$]∩N and [1, $N_K^{fine}$]∩N is described in terms of bookmarks $BMI_i \in [1, N_I^{fine}-1] \cap N, i=1, \ldots, N_I^{coarse}-1,$ $BMJ_j \in [1, N_J^{fine}-1] \cap N, j=1, \ldots, N_J^{coarse}-1,$ $BMK_k \in [1, N_K^{fine}-1] \cap N, k=1, \ldots, N_K^{coarse}-1.$ Bookmarks are just the integers between 1 and the number of fine grid cells in the corresponding direction minus one. All the coarse grid cells between the two closest bookmarks are lumped together.

If the bookmarks are ordered in ascending order, then the relation between the bookmarks and the coarse cell widths is $$BMX_x = \sum_{q=1}^{x} dX_q,$$

where $X \in \{I, J, K\}$, $\chi \in \{i, j, k\}$.

The FIG. 1.1 shows the relation between the bookmarks and coarse cell widths for one direction I in case of $N_I^{fine}=10$, $N_I^{coarse}=3$. The bounds for the bookmarks 1 and $N_I^{fine}-1=9$ are plotted as the small circles.

The next FIG. 1.2 demonstrates the degenerate case when we allow cell widths $dI_i$ to be equal to zero. In this case the bookmarks $BMI_i$ are within the interval $[0, N_I^{fine}] \cap N$ and also two different bookmarks can accept the same value. If we allow such behavior of the cell widths and bookmarks then the number of coarse grid cells can be anything between 1 and the original value $N_I^{coarse}$.

Since we are interested in optimizing the objective function over the possible grid coarsening we have to choose a formal numerical way of describing the coarsening. We can choose to describe the coarsened grid in terms of coarse grid cell widths or the bookmarks. Let us compare these two approaches from the optimizational point of view.

Coarse grid cell width approach.

When choosing the coarse grid cells as the optimization variables we have both bound constraints and linear (equality or inequality) constraints as described above. The advantage of this approach is that the set of coarse grid cell widths describes the coarsened grid uniquely, so we have a small non-redundant search space (space of feasible solutions). The downside is that the optimizer has to treat somehow the linear constraints.

Bookmark approach.

If we use bookmarks as our optimization variables we have only bound constraints. The obvious advantage is that the feasibility can be easily maintained for almost any optimizer. On the downside we have a much larger search space than in the case of the cell width approach. This is because the ordered set of bookmarks does not uniquely determines the coarse grid. If two ordered sets of bookmarks are permutations of each other then they correspond the same grid coarsening. If our vector of optimization variables is just an ordered set of bookmarks then the objective function has a lot of symmetries in terms of swaps of two variables:

$F(\ldots, BMX_y, \ldots, BMX_z, \ldots) = F(\ldots, BMX_z, \ldots, BMX_y, \ldots),$ for any pair of indices y, z $\in [1, N_X^{fine}] \cap N$. This implies that the number of local minima is increased because of this symmetries. Each local minimum is duplicated the number of times which grows exponentially with the total number of optimization variables (bookmarks). Thus an objective function can become very multimodal.

After taking into consideration the features of the two possible choices of optimization variables it was decided that it is more important to have less constraints and an easily maintainable feasibility than a smaller search space. The bookmarks were used as the optimization variables for the grid coarsening problem.

1.3 Problem Formulation

After considering the choices of the objective function and the optimization variables we can finally formulate our optimization problem.

The black-box reservoir simulator (ECLIPSE) computes the following function $FOPT(t_q, BM, R)$, which is the Field Oil Production Total for the given reservoir. The inputs are BM a vector of bookmarks specifying the coarsened grid and R a vector of flow rates for the production and injection wells. The discrete parameter $t_q$, $q=1, \ldots, N_{max}^T$, represents the periods in time at which the value of FOPT is available from the simulator[1].

The vector of bookmarks BM represents the optimization variables of the optimization problem. It consists of three sections BM={BMI, BMJ, BMK}. Each of these sections contain bookmarks corresponding to a particular coordinate direction of the reservoir model. Since the COARSEN keyword functionality is used for averaging the reservoir properties, the components of the vector BM are integers. Note that the function $FOPT(t_q, BM, R)$ is symmetric up to the swaps of two bookmarks inside a particular section of the BM vector. The constraints for the optimization variables are bound constraints of the form:

$BMI_i \in [1, N_I^{fine}-1] \cap N, i=1, \ldots, N_I^{coarse}-1,$ $BMJ_j \in [1, N_J^{fine}-1] \cap N, j=1, \ldots, N_J^{coarse}-1,$ $BMK_k \in [1, N_K^{fine}-1] \cap N, k=1, \ldots, N_K^{coarse}-1.$ where $N_I^{coarse}$, $N_J^{coarse}$ and $N_K^{coarse}$ are the dimensions of the fine grid of the reservoir model.

The vector of the flow rates R represents the parameters of the reservoir model. Our goal is to fit the FOPT as the function of these parameters with a coarse grid model. It means that for our optimal solution $BM_{opt}$ we want the functions $FOPT(t_q, BM_{opt}, R)$ and $FOPT^{fine}(t_q, R)$ be as close as possible over the space of admissible flow rates R. We achieve that goal by sampling the space of flow rates in some points (these have to be carefully selected by the reservoir engineer, so that these points are distributed over the whole space of admissible flow rates) at which we evaluate our fine grid model to obtain $FOPT^{fine}(t_q, R)$. We call these points in the space of flow rates a training set or calibration points (the term used in the code). Then we do a data fit of these $FOPT^{fine}$ values, which in terms of optimization means that the objective function used is of the form:

$$F_{*,**}(BM) = \frac{1}{N_{calibration}} \left\| \frac{\|FOPT^{fine}(t_q, R_p) - FOPT(t_q, BM, R_p)\|_*}{\|FOPT^{fine}(t_q, R_p)\|_*} \right\|_{**},$$

where $N_{calibration}$ is the number of calibration points, the indices q and p are introduced to emphasize that t and R are taken from the discrete finite set. The discrete norm $\|\ldots\|_*$ is taken over the time periods $t_q$, $q=1,\ldots,N_{max}^T$. The discrete norm $\|\ldots\|_{**}$ is taken over the calibration points $R_p$, $p=1,\ldots,N_{calibration}$. Two choices of the norms are implemented in the code.

Calibration fit approach. In this case we define the norm $\|\ldots\|_*$ as $\|G(t_q)\|_* = |G(t_{N_{max}^T})|$, i.e. we only consider the value of the function at the final time $t_{N_{max}^T}$. The norm $\|\ldots\|_{**}$ is defined as the square of the discrete 2-norm (which is not a norm in a strict sense, because in does not scale properly).

History fit approach. In this case we define both $\|\ldots\|_*$ and $\|\ldots\|_{**}$ as discrete 1-norms:

$$\|G(t_q)\|_* = \sum_{r=1}^{N_{max}^T} |G(t_r)|,$$

$$\|G(R_p)\|_{**} = \sum_{r=1}^{N_{calibration}} |G(R_r)|.$$

To sum up our optimization problem take the following form: minimize $F^{*,**}(BM)$, with one of the above choices of the norms, subject to the bound constraints for the integer vector BM.

1.4 Reservoir Models

The optimization methods were tested on two real-life reservoir models.

A first field is an onshore field. Originally a gas field, it was refined as an oil field. It contains ten wells: four oil producers and six gas injectors. The model associated with this first field uses a corner-point grid of dimensions [39][46][5]. The grid is shown in FIG. 1.3.

A second field is an offshore field in the North Sea, Norway. It contains eleven (11) wells, six oil producers and five water injectors. The model associated with this second field uses a grid of dimensions [34][58][19]. The grid is shown in FIG. 1.4.

Optimization Algorithms

In this chapter different optimization methods and the results obtained when applying these methods to our optimization problem are discussed. The specifics of the grid optimization problem severely reduce the types of algorithms which can be applied to it. The three main restrictions are discussed below.

Integer control variables. Due to the limitations of the COARSEN keyword functionality the coarse grid lines can only be placed on top of the fine grid lines. This results in the optimization variables being integer numbers. Most integer optimization methods use some sort of relaxation of integrality conditions and thus require evaluation of the objective function at non-integer points, which is impossible because of the restrictions imposed by ECLIPSE.

Non-linearity. Though many powerful techniques exist for integer optimization most of them are suited only for linear problems. Since the objective function is highly non-linear these methods cannot be applied in our case.

Absence of gradient information. The only information about the objective function that is available at a given point is the objective function value. No gradient or Hessian information is available. The finite difference approximations to the derivatives cannot be computed since the objective function cannot be evaluated at sufficiently small neighborhood of the point because of integrality conditions.

Taking into consideration the above restrictions only two types of optimization techniques can be used to solve our problem. These are stochastic methods and deterministic direct-search algorithms.

Remark. When the results of the test runs are given the dimension of the problem is given in the following format: $DX(n_{BMI}, n_{BMJ}, n_{BMK})$, where D means 'dimension', $X = n_{BMI} + n_{BMJ} + n_{BMK}$ is the overall problem dimension, $n_{BMI}$, $n_{BMJ}$ and $n_{BMK}$ are the numbers of bookmarks in I, J and K directions respectively. The resulting coarse grid has the dimensions of $(n_{BMI}+1) \times (n_{BMJ}+1) \times (n_{BMK}+1)$ coarse grid cells. The format used for grid dimensions is $[N_I][N_J][N_K]$.

2.1 Differential Evolution 2.1.1 DE: Description

Differential evolution [2] is a stochastic optimization algorithm of evolutionary type. At each iteration of the algorithm a population of solutions is maintained. The solutions in the population are breed among each other and compared to the corresponding parent. If the offspring is better than the parent (has a lower objective function value in case of a minimization problem) it replaces its parent in the population, otherwise the new solution is discarded.

The method is considered to be a global one in the sense that it is not restricted to the neighborhood of the initial guess, but explores the whole space of optimization variables instead. The price to pay for the 'globalness' of the method is typically a slow convergence.

One of the advantages of the Differential Evolution method is a small number of control parameters. Only four control parameters are used: the size of the population $N_p$, crossover probability CR, crossover factor F and a greediness parameter $\lambda$ which is used in some versions of DE. In addition several different crossover strategies are available.

2.1.2 DE: Implementation and Results

The implementation was based on the C code (version 3.6) by Rainer Storn and Kenneth Price, which is available online at http://www.icsi.berkeley.edu/storn/code.html.

The bound constraints were treated in a very simple way. If after the crossover the variable violated the bound constraints it was replaced by a randomly generated integer inside the feasible interval. The other approach is to substitute the infeasible value with the corresponding value of the best solution from the current population (see isbest control flag in the code), though it may harm the diversity of the population.

Another feature that was implemented specifically for the grid optimization problem is that the crossover is performed on the sorted solution vectors (the bookmarks are sorted in increasing order, see isrearr control flag in the code). This approach slightly decreases the diversity, but increases the possibility of faster convergence.

Out of the large number of available crossover strategies two different strategies were implemented. According to Storn&Price notation these are denoted as rand/.1/exp and rand-to-best/1/exp. The authors claim that these strategies are the most powerful. For our problem it seems that the strategy rand-to-best/1/exp gives the best results.

The control parameters were chosen close to the default values suggested by the authors for different crossover strategies. For rand-to-best/1/exp the values of the control parameters used were F=0.85, CR=0.99, $\lambda$=0.95.

Several sizes of the population were considered. It seems that for a reasonable diversity of the population $N_p$ should not be less than 50. The values of $N_p$ around 5 times the number of the optimization variables work good for most cases, but the computational cost of the optimization can increase dramatically for the problems of high dimension.

Differential Evolution was tested on the first field model. Convergence history for one of the test runs is given in FIG. 2.1. Objective function values are plotted for all the solutions in the population. The best and the worst objective function values are plotted as black lines. Note that after a period of fast initial convergence it becomes increasingly difficult for the method to further improve the best objective function value. The convergence after about 5 first iterations displays step-like behavior with more and more iterations between the steps.

While DE algorithm was able to improve the value of the objective function significantly it also demonstrated a very slow convergence. For the test run on the plot 2.1 about 2100 objective function calls were made. With an average simulation time for Pekisko model of about 5 seconds (on SMP SGI machine with 32 Intel Itanium processors) the total run time of the optimization is almost 3 hours. Very slow convergence of DE makes us consider other types of optimization algorithms which sacrifice "globality" to some extent in order to get faster convergence.

2.2 Nelder-Mead Downhill Simplex

2.2.1 NM: Description

Nelder-Mead Downhill Simplex method [3] is a derivative-free optimization algorithm. It performs the search for a better solution by sampling the search space in the vertices of a simplex which evolves at each iteration of the algorithm. The evolution of the simplex is done through reflection, extension and contraction steps until is becomes small enough so that the algorithm can be stopped. Downhill simplex deals with unconstrained optimization problems in continuous search space, so some modifications the method are needed to deal with bound constraints and discrete optimization variables.

The simplest possible way to deal with integer optimization variables is to let the simplex evolve in the continuous space, but perform the objective functions evaluations at the points rounded to the nearest integer. Another approach is to add some penalty to the objective function for the non-ingerality of the optimization variables.

The bound constraints can be handled in two different ways. One possible way is since the method only uses comparisons between the objective function values and not the values themselves, to use Takahama's lexicographical approach [4]. The second possibility is to use the penalty function.

2.2.2 NM: Implementation and Results

Two implementations of the downhill-simplex were used. The first implementation makes use of Takahama's lexicographical treatment of bound constraints as well as a simple rounding technique to deal with the integer optimization variables. The other implementation used was the one from SDR optimization library package. It deals with both bound constraints violations and non-integrality of optimization variables by adding a penalty to the objective function. Both variants demonstrated very similar behaviors.

Downhill-simplex method was tested on the first field model. Consider the plot of FIG. 2.2 of the objective function value for the best simplex point. The best point for a minimization problem is a point with the minimal objective function value. We can see that the method was able to decrease the value of the objective function before it converged. The method was stopped when the simplex became sufficiently small.

Now we consider the evolution of the simplex. The plot 2.3 shows the distance in $\infty$-norm from the best point of the initial simplex to all the points in the simplex at each iteration. It can be seen from the plot that the initial best point has stayed in the simplex for all iterations except the last two. And the $\infty$-norm distance from the final point to the initial best point is 1, which means that the final best point differs only slightly from the initial one. This suggests that the simplex is very strongly attracted to the best initial point and the same results can be easily achieved by just performing a direct search over the small neighborhood of the initial best point. The FIG. 2.4 shows the distance in $\infty$-norm from the best initial point to the best point in the simplex versus the iteration number. We see that the final solution is in the immediate neighborhood ($\infty$-norm distance of 1) of the initial guess.

2.3 Neural Net Optimizer

The neural net optimizer is a part of SDR optimization package. It substitutes the expensive objective function by the cheap neural net model and performs the optimization on that model using downhill-simplex method when the optimization on the neural-net model is done the method reevaluates the actual objective function at a minimum of the neural net model and if the neural net model failed to capture the behavior of the actual objective the neural net is retrained and another iteration is performed. The method works well for smooth objective functions. However in our problem due to non-smoothness and multimodality of the objective the method failed to go anywhere from the initial guess.

2.4 Direct Search Methods

Direct Search is a class of optimization methods which sample the search space at the points along some set of directions. Here we consider the algorithms which use coordinate directions as the set of search directions. One of the reasons for such choice of methods is that there is no notion of "direction" in discrete space other than coordinate direction.

2.4.1 Sweeper: The Greedy Method

The greedy approach for a direct search works as follows:
1. Pick an initial solution BM
2. Pick a direction $(X, \chi)$, where $X \in \{I, J, K\}$, $\chi \in [1, n_{BMX}] \cap N$, $n_{BMX} = N_X^{coarse} - 1$
3. Perform a full search along the direction $(X, \chi)$: keep all the bookmarks fixed except for $BMX_\chi$, compute the objective function values for all the positions of $BMX_\chi \in [1, N_X^{fine} - 1]$, pick a position of $BMX_\chi$ with a best (smallest) objective function value, assign this position to $BMX_\chi$
4. Exit if the stopping criterion is satisfied, otherwise go to 2

We should ensure that at the step 2 all the coordinate directions are visited in a "uniform" manner. It is a good idea to alternate between the sets BMI, BMJ or BMK at each step.

The plot on the FIG. 2.5 shows the topology of the objective function which the method encounters while performing the search along one coordinate direction. It can be seen that even a one-dimensional projection of the objective function is highly multimodal, which implies that the multidimensional topology of the objective is very complicated.

The FIG. 2.6 shows the convergence history of the Sweeper method. It can be seen that due to its greedy nature the method has a very fast initial convergence and relatively slow convergence afterward. In fact we can see that the last 150 out of total 350 objective function evaluations were wasted without any improvement of the objective function value. It seems that by being too greedy in the initial phase of the optimization the method quickly reaches a neighborhood of a local minimum and further improvement of the solution becomes impossible.

The other issue with the greedy approach is the computational cost. Even if we visit each bookmark only once the number of the objective function calls becomes $n_{BMI}(N_I^{fine} - 2) + n_{BMJ}(N_J^{fine} - 2) + n_{BMK}(N_K^{fine} - 2)$. For a moderately sized Pekisko model $N_I^{fine} = 39$, $N_J^{fine} = 46$, $N_K^{fine} = 5$, and a rather coarse [11][11][4] grid D23(10, 10, 3) we have to make over 700 objective function evaluations each requiring several calls to ECLIPSE simulator.

The issues with the computational cost and the excessive greediness of the algorithm can be solved by introducing a less greedy Slicer scheme.

2.4.2 Slicer: Less Greedy Method

Slicer method addresses the problems of Sweeper by restricting the search to a close neighborhood of the current solution. Here is how one iteration of Slicer looks like.
1. Start with an initial guess BM, sort the bookmarks in each set BMI, BMJ and BMK in increasing order
2. Pick an unvisited direction $(X, \chi)$, where $X \in \{I, J, K\}$, $\chi \in [1, n_{BMX}] \cap N$, $n_{BMX} = N_X^{coarse} - 1$
3. Determine the bounds for the search interval $[BMX_{\chi-1} + 1, BMX_{\chi+1} - 1]$, where $BMX_0 = 0$, $BMX_{N_X^{coarse}} = N_X^{fine}$
4. Evaluate the objective function value for all the positions of $BMX_\chi$ in the search interval while keeping the other bookmarks fixed, pick the position with the smallest objective function value
5. Exit if all the directions has been visited, otherwise mark $(X, \chi)$ as visited and go to 2

Note that since the bookmarks are sorted in increasing order, for a given bookmark $BMX_\chi$ the search is performed only between the two neighboring bookmark positions $BMX_{\chi-1} + 1$ and $BMX_{\chi+1} - 1$ (for the first or the last bookmarks in the set BMX correspondingly the lower or upper bound of the search interval is substituted with 1 or $N_X^{fine} - 1$). When the new position for $BMX_\chi$ is accepted the order of the bookmarks in the set BMX is preserved.

While Slicer is less greedy and less expensive than Sweeper it can suffer from being "too local". To deal with this issue the globalization technique is used. It was observed that the profile of the objective function when one bookmark is adjusted between two neighboring demonstrates two distinct types of behavior. The FIG. 2.7 shows what has been called "high deviation" behavior, while the FIG. 2.8 illustrates the "low deviation" behavior. The term deviation here has almost the same meaning as in statistics. Consider a set of objective function values $\{F_m\}_{m=1}^{m=M}$ corresponding to the positions of the bookmark $BMX_\chi = p_1, \ldots, p_M$. Let $F_{min} = \min_{m=1, \ldots, M} F_m$, then the deviation is defined as $$D = \frac{1}{M} \sum_{m=1}^{M} \left( \frac{F_m - F_{min}}{F_{min}} \right)^2$$

It is easy to see now why the interval with high oscillations in objective function value and larger difference between the minimum and the other points has a high deviation value. It is obvious that the deviation shows how sensitive is the objective function at current point to the change of the corresponding bookmark position. It was also observed that if the objective function demonstrates a high deviation behavior with respect to changes in some bookmark's position, then it is very likely that the local minimum has been reached along the direction of this optimization variable. On the other hand if the objective function is not very sensitive to the changes in one of the optimization variables chances are high that a further search along this direction may give an improvement in the objective function value.

The globalization technique takes the following form.

Inside Slicer iteration compute the deviations corresponding to each bookmark.

After the Slicer iteration is complete and the deviation information is available for all bookmarks pick a bookmark $BMX_\chi$ with a least deviation and perform a full search for this bookmark $BMX_\chi = 1, \ldots, N_X^{fine} - 1$, while keeping other bookmarks fixed. Accept the new position of the bookmark as the one for which the minimal objective function value is achieved.

If necessary perform the previous step several times picking the bookmark with the next lower deviation value.

Globalization is an example of a trade-off between speed in obtaining the solution and quality of the obtained solution. Several globalization strategies in terms of the number of globalization steps can be used. Two main choices are "frugal" and "aggressive".

If we want to keep the number of objective function evaluations as low as possible we use a frugal technique which performs only one globalization step after each Slicer iteration. The number of globalization steps may be increased towards the end of optimization based on the improvement in the objective function value.

If we want to get a fast improvement in the objective function value right from the start, aggressive strategy can be used. Under this strategy the most globalization steps are performed after the first Slicer iteration and for consecutive Slicer iterations the number of globalization steps decreases.

This "Slicer+globalization" strategy gives a highly balanced method. It is not greedy to be easily trapped in a local minimum, but is has some degree of globalness to escape the local minimum if it is not good enough. It is also cheaper then the Sweeper because it performs exhaustive searches only for the bookmarks for which it makes sense. The FIG. 2.9 shows the convergence history of the globalized Slicer method.

The balance between the quality of optimization and computational cost makes the globalized Slicer a method of choice for optimal grid coarsening problems.

The above description of the 'Coarsening Software' 12 being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

We claim:

1. A method for optimal gridding in a reservoir simulation, comprising:
   establishing an optimal coarse grid proxy that can replace all or parts of a fine grid with a coarse grid while preserving an accuracy of a predefined simulation model output, said step of establishing an optimal coarse grid proxy including:
      constructing a training set by using said fine grid to calculate a plurality of fine-grid solutions for said predefined simulation model output, wherein each of said plurality of fine-grid solutions is calculated using one of a plurality of control variable values;
      until subsequent values of an objective function converge to within a predefined threshold, iteratively:
         adjusting coarse grid line positions to obtain an adjusted coarse grid;
         evaluating said objective function to compare simulation results obtained using said adjusted coarse grid with results of said training set, wherein said adjusted coarse grid includes a plurality of coarse grid cells, said fine grid including a plurality of fine grid cells, each coarse grid cell encompassing one or more of said fine grid cells; and
         averaging a set of material properties of said one or more of said fine grid cells into said each coarse grid cell; and
      once said subsequent values of said objective function converge to within said predefined threshold, generating said optimal coarse grid proxy based on said adjusted coarse grid;
   conducting said reservoir simulation using said optimal coarse grid proxy; and
   displaying said reservoir simulation.

2. The method of claim 1, wherein said plurality of control variable values includes production and injection rates.

3. The method of claim 1, wherein said objective function comprises an 'L2 norm', said 'L2 norm' comprising a best least squares fit.

4. The method of claim 1, wherein said objective function comprises an 'L1 norm'.

5. The method of claim 1, wherein said objective function comprises an 'L infinity norm'.

6. The method of claim 1, wherein said averaging step comprises Arithmetic averaging.

7. The method of claim 1, wherein said averaging step comprises Harmonic averaging.

8. The method of claim 1, wherein said averaging step comprises a reservoir simulator COARSEN keyword type of averaging, said COARSEN keyword type of averaging including averaging adapted for averaging bulk material properties and transmissibilities of said one or more of said fine grid cells into said each coarse grid cell.

9. The method of claim 8, wherein said bulk material properties include permeability and porosity, said COARSEN keyword type of averaging adapted for averaging the permeability, said porosity, and said transmissibility of said one or more of said fine grid cells into said each coarse grid cell.

10. A computer readable medium comprising software instructions for optimal gridding in a reservoir simulation, said software instructions when executed causing a processor to:
   establish an optimal coarse grid proxy that can replace all or parts of a fine grid with a coarse grid while preserving an accuracy of a predefined simulation model output, said step of establishing an optimal coarse grid proxy including:
      constructing a training set by using said fine grid to calculate a plurality of fine-grid solutions for said predefined simulation model output, wherein each of said plurality of fine-grid solutions is calculated using one of a plurality of control variable values;
      until subsequent values of an objective function converge to within a predefined threshold, iteratively:
         adjusting coarse grid line positions to obtain an adjusted coarse grid;
         evaluating said objective function to compare simulation results obtained using said adjusted coarse grid with results of said training set, wherein said adjusted coarse grid includes a plurality of coarse grid cells, said fine grid including a plurality of fine grid cells, each coarse grid cell encompassing one or more of said fine grid cells; and
         averaging a set of material properties of said one or more of said fine grid cells into said each coarse grid cell; and
      once said subsequent values of said objective function converge to within said predefined threshold, generating said optimal coarse grid proxy based on said adjusted coarse grid;
   conduct said reservoir simulation using said optimal coarse grid proxy; and
   display said reservoir simulation.

11. The computer readable medium of claim 10, wherein said plurality of control variable values includes production and injection rates.

12. The computer readable medium of claim 10, wherein said objective function comprises an 'L2 norm', said 'L2 norm' comprising a best least squares fit.

13. The computer readable medium of claim 10, wherein said objective function comprises an 'L1 norm'.

14. The computer readable medium of claim 10, wherein said objective function comprises an 'L infinity norm'.

15. The computer readable medium of claim 10, wherein said averaging step comprises Arithmetic averaging.

16. The computer readable medium of claim 10, wherein said averaging step comprises Harmonic averaging.

17. The computer readable medium of claim 10, wherein said averaging step comprises a reservoir simulator COARSEN keyword type of averaging, said COARSEN keyword type of averaging including averaging adapted for averaging bulk material properties and transmissibilities of said one or more of said fine grid cells into said each coarse grid cell.

18. The computer readable medium of claim 17, wherein said bulk material properties include permeability and porosity, said COARSEN keyword type of averaging adapted for averaging said permeability, said porosity, and said transmissibility of said one or more of said fine grid cells into said each coarse grid cell.

19. A system adapted for performing optimal gridding in a reservoir simulation, said system comprising:
- a processor;
- a memory comprising software instructions, said software instructions when executed causing said processor to:
  - establish an optimal coarse grid proxy that can replace all or parts of a fine grid with a coarse grid while preserving an accuracy of a predefined simulation model output, establishing an optimal coarse grid proxy including:
    - constructing a training set by using said fine grid to calculate a plurality of fine-grid solutions for said predefined simulation model output, wherein each of said plurality of fine-grid solutions is calculated using one of a plurality of control variable values;
    - until subsequent values of an objective function converge to within a predefined threshold, iteratively:
      - adjusting coarse grid line positions to obtain an adjusted coarse grid;
      - evaluating said objective function to compare simulation results obtained using said adjusted coarse grid with results of said training set, wherein said adjusted coarse grid includes a plurality of coarse grid cells, said fine grid including a plurality of fine grid cells, each coarse grid cell encompassing one or more of said fine grid cells; and
      - averaging a set of material properties of said one or more of said fine grid cells into said each coarse grid cell: and
    - once said subsequent values of said objective function converge to within said predefined threshold, generating said optimal coarse grid proxy based on said adjusted coarse grid;
  - conduct said reservoir simulation using said optimal coarse grid proxy; and
  - display said reservoir simulation.

20. The system of claim 19, wherein said plurality of control variable values includes production and injection rates.

21. The system of claim 19, wherein said objective function comprises an 'L2 orm', said 'L2 norm' comprising a best least squares fit.

22. The system of claim 19, wherein said objective function comprises an 'L1 norm'.

23. The system of claim 19, wherein said objective function comprises an 'L infinity norm'.

24. The system of claim 19, wherein averaging a set of material properties comprises conducting Arithmetic averaging.

25. The system of claim 19, wherein averaging a set of material properties comprises conducting Harmonic averaging.

26. The system of claim 19, wherein averaging a set of material properties comprises conducting a reservoir simulator COARSEN keyword type of averaging, said COARSEN keyword type of averaging including averaging adapted for averaging bulk material properties and transmissibilities of said one or more of said fine grid cells into said each coarse grid cell.

27. The system of claim 26, wherein said bulk material properties include permeability and porosity, said COARSEN keyword type of averaging adapted for averaging the permeability, said porosity, and said transmissibility of said one or more of said fine grid cells into said each coarse grid cell.

28. A method for optimal gridding in a reservoir simulation, comprising:
- establishing an optimal coarse grid proxy that can replace all or parts of a fine grid with a coarse grid while preserving an accuracy of a predefined simulation model output, said coarse grid including a plurality of coarse grid cells, said fine grid including a plurality of fine grid cells, each coarse grid cell encompassing one or more of said fine grid cells, said step of establishing an optimal coarse grid proxy including:
  - constructing a training set by using said fine grid to calculate a plurality of fine-grid solutions for said predefined simulation model output, wherein each of said plurality of fine-grid solutions is calculated using one of a plurality of control variable values;
  - until subsequent values of an objective function converge to within a predefined threshold, iteratively:
    - adjusting coarse grid line positions of said coarse grid to obtain an adjusted coarse grid;
    - evaluating said objective function to compare simulation results obtained using said adjusted coarse grid with results of said training set; and
    - averaging a set of material properties of said one or more of said fine grid cells into said each coarse grid cell; and
  - once said subsequent values of said objective function converge to within said predefined threshold, generating said optimal coarse grid proxy based on said adjusted coarse grid;
- conducting said reservoir simulation using said optimal coarse grid proxy; and
- displaying said reservoir simulation.

29. The method of claim 28, wherein said averaging step comprises Arithmetic averaging.

30. The method of claim 28, wherein said averaging step comprises Harmonic averaging.

31. The method of claim 28, wherein said averaging step comprises a reservoir simulator COARSEN keyword type of averaging, said COARSEN keyword type of averaging including averaging adapted for averaging bulk material properties and transmissibilities of said one or more of said fine grid cells into said each coarse grid cell.

32. The method of claim 31, wherein said bulk material properties include permeability and porosity, said COARSEN keyword type of averaging adapted for averaging the permeability, said porosity, and said transmissibility of said one or more of said fine grid cells into said each coarse grid cell.

33. A computer readable medium comprising software instructions for optimal gridding in a reservoir simulation, said software instructions when executed causing a processor to:
- establish an optimal coarse grid proxy that can replace all or parts of a fine grid with a coarse grid while preserving an accuracy of a predefined simulation model output, said coarse grid including a plurality of coarse grid cells, said fine grid including a plurality of fine grid cells, each coarse grid cell encompassing one or more of said fine grid cells, said step of establishing an optimal coarse grid proxy including:
  - constructing a training set by using said fine grid to calculate a plurality of fine-grid solutions for said predefined simulation model output, wherein each of said plurality of fine-grid solutions is calculated using one of a plurality of control variable values;

until subsequent values of an objective function converge to within a predefined threshold, iteratively:

adjusting coarse grid line positions of said coarse grid to obtain an adjusted coarse grid;

evaluating said objective function to compare simulation results obtained using said adjusted coarse grid with results of said training set; and averaging a set of material properties of said one or more of said fine grid cells into said each coarse grid cell; and once said subsequent values of said objective function converge to within said predefined threshold, generating said optimal coarse grid proxy based on said adjusted coarse grid;

conduct said reservoir simulation using said optimal coarse grid proxy; and display said reservoir simulation.

34. The computer readable medium of claim 33, wherein said averaging step comprises Arithmetic averaging.

35. The computer readable medium of claim 33, wherein said averaging step comprises Harmonic averaging.

36. The computer readable medium of claim 33, wherein said averaging step comprises a reservoir simulator COARSEN keyword type of averaging, said COARSEN keyword type of averaging including averaging adapted for averaging bulk material properties and transmissibilities of said one or more of said fine grid cells into said each coarse grid cell.

37. The computer readable medium of claim 36, wherein said bulk material properties include permeability and porosity, said COARSEN keyword type of averaging adapted for averaging the permeability, said porosity, and said transmissibility of said one or more of said fine grid cells into said each coarse grid cell.

38. A system adapted for performing optimal gridding in a reservoir simulation, said system comprising:

a processor;

a memory comprising software instructions, the software instructions when executed causing said processor to:

establish an optimal coarse grid proxy that can replace all or parts of a fine grid with a coarse grid while preserving an accuracy of a predefined simulation model output, said coarse grid including a plurality of coarse grid cells, said fine grid including a plurality of fine grid cells, each coarse grid cell encompassing one or more of said fine grid cells, establishing an optimal coarse grid proxy including:

constructing a training set by using said fine grid to calculate a plurality of fine-grid solutions for said predefined simulation model output, wherein each of said plurality of fine-grid solutions is calculated using one of a plurality of control variable values;

until subsequent values of an objective function converge to within a predefined threshold, iteratively:

adjusting coarse grid line positions of said coarse grid to obtain an adjusted coarse grid;

evaluating said objective function to compare simulation results obtained using said adjusted coarse grid with results of said training set; and averaging a set of material properties of said one or more of said fine grid cells into said each coarse grid cell; and once said subsequent values of said objective function converge to within said predefined threshold, generating said optimal coarse grid proxy based on said adjusted coarse grid;

conduct said reservoir simulation using said optimal coarse grid proxy; and display said reservoir simulation.

39. The system of claim 38, wherein averaging a set of material properties comprises performing Arithmetic averaging.

40. The system of claim 38, wherein averaging a set of material properties comprises performing Harmonic averaging.

41. The system of claim 38, wherein averaging a set of material properties comprises performing a reservoir simulator COARSEN keyword type of averaging, said COARSEN keyword type of averaging including averaging adapted for averaging bulk material properties and transmissibilities of said one or more of said fine grid cells into said each coarse grid cell.

42. The system of claim 41, wherein said bulk material properties include permeability and porosity, said COARSEN keyword type of averaging adapted for averaging the permeability, said porosity, and said transmissibility of said one or more of the fine grid cells into said each coarse grid cell.

* * * * *